United States Patent
Iioka et al.

(10) Patent No.: US 8,711,434 B2
(45) Date of Patent: Apr. 29, 2014

(54) IMAGE PROCESSING DEVICE, IMAGE FORMING APPARATUS, AND NON-TRANSITORY COMPUTER READABLE RECORDING MEDIUM

(75) Inventors: Mitsuru Iioka, Kanagawa (JP); Noribumi Sato, Kanagawa (JP); Jun Koyatsu, Kanagawa (JP); Kaoru Yamauchi, Kanagawa (JP); Keiichi Okada, Kanagawa (JP); Hatsuho Ajima, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 299 days.

(21) Appl. No.: 13/095,482

(22) Filed: Apr. 27, 2011

(65) Prior Publication Data
US 2012/0086985 A1  Apr. 12, 2012

(30) Foreign Application Priority Data

Oct. 12, 2010 (JP) .................................. 2010-229946

(51) Int. Cl.
*H04N 1/40* (2006.01)
(52) U.S. Cl.
USPC .......................................... 358/3.2; 358/3.06
(58) Field of Classification Search
USPC ................... 358/3.2–3.22, 1.9, 2.1, 500, 504, 358/3.06–3.14, 536, 534, 535; 399/180–181
See application file for complete search history.

(56) References Cited

U.S. PATENT DOCUMENTS

| | | | | |
|---|---|---|---|---|
| 4,251,625 A | * | 2/1981 | Sakamoto et al. | ............. 347/251 |
| 6,643,030 B1 | * | 11/2003 | Loce et al. | ..................... 358/1.9 |
| 6,778,298 B1 | * | 8/2004 | Sonoda et al. | ............... 358/3.01 |
| 7,375,857 B1 | * | 5/2008 | Pinard et al. | ................. 358/3.21 |
| 2001/0013941 A1 | | 8/2001 | Ogiyama et al. | |
| 2006/0066910 A1 | | 3/2006 | Yasutomi | |

FOREIGN PATENT DOCUMENTS

| | | |
|---|---|---|
| JP | 2001-219599 A | 8/2001 |
| JP | 2006-101264 A | 4/2006 |
| JP | 2006-254095 A | 9/2006 |

* cited by examiner

*Primary Examiner* — Thomas D Lee
*Assistant Examiner* — Stephen M Brinich
(74) *Attorney, Agent, or Firm* — Sughrue Mion, PLLC

(57) ABSTRACT

An image processing device includes a processor. The processor executes a screen process by using different screens for respective color components which are newly used in response to N colors ranging from a primary color in an output color space to a Nth color, in the output color space, obtained by mixing the primary color with other primary colors in order, where N denotes natural number equal to or larger than 2.

17 Claims, 19 Drawing Sheets

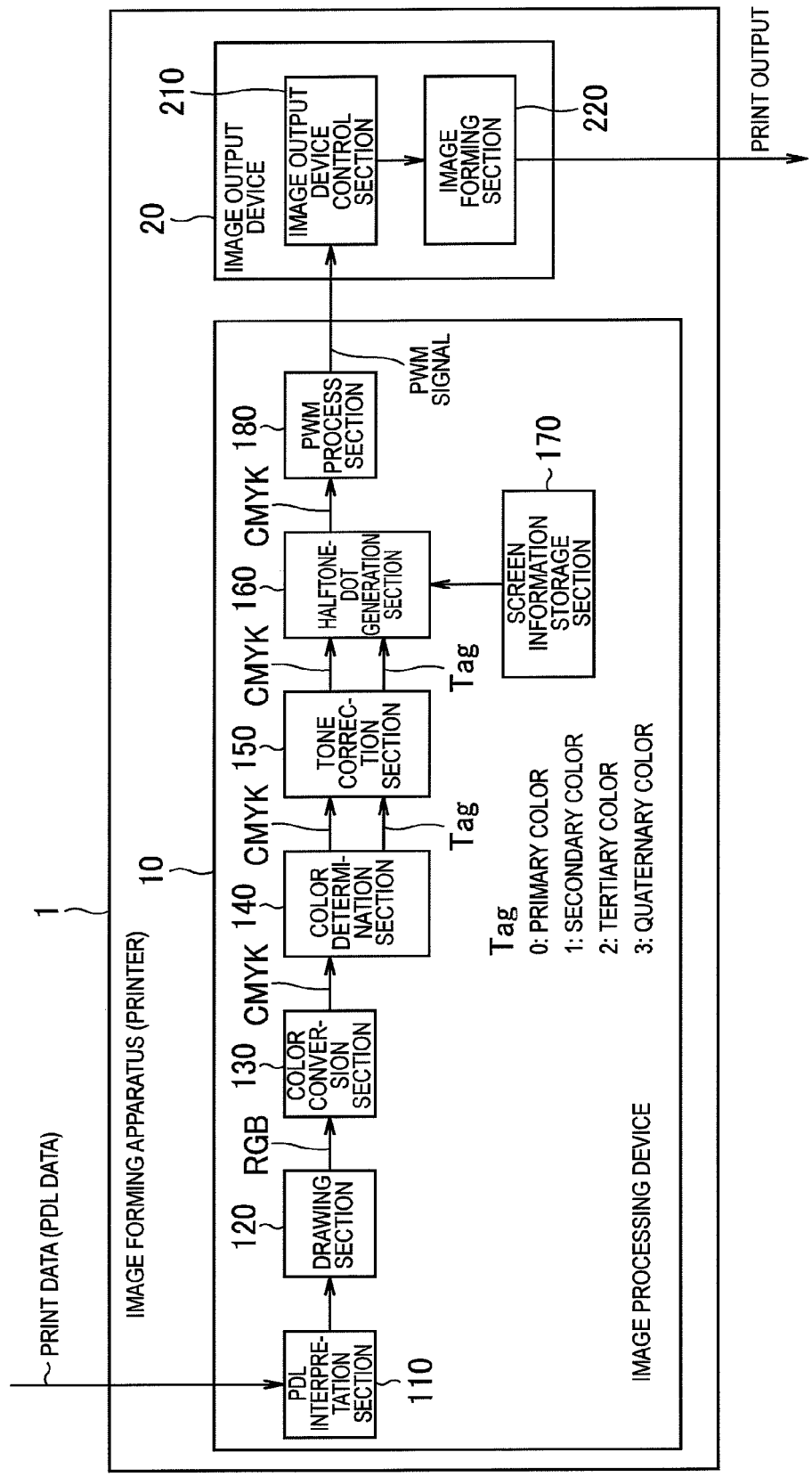

FIG. 2

300 SCREEN INFORMATION

| Tag | SCREEN | FIRST SCREEN 321 | | SECOND SCREEN 322 | | THIRD SCREEN 323 | | FOURTH SCREEN 324 | |
|---|---|---|---|---|---|---|---|---|---|
| | | RULING (lpi) | ANGLE (deg) | RULING (lpi) | ANGLE (deg) | RULING (lpi) | ANGLE (deg) | RULING (lpi) | ANGLE (deg) |
| 301 — 0 | FOR PRIMARY COLOR | 166 | 56 | | | | | | |
| 302 — 1 | FOR SECONDARY COLOR | 166 | 56 | 146 | 104 | | | | |
| 303 — 2 | FOR TERTIARY COLOR | 166 | 56 | 146 | 104 | 146 | 14 | | |
| 304 — 3 | FOR QUATERNARY COLOR | 166 | 56 | 146 | 104 | 146 | 14 | 134 | 153 |

FIRST SCREEN = SCREEN CORRESPONDING TO PRIMARY COLOR
SECOND SCREEN = SCREEN CORRESPONDING TO SECONDARY COLOR
THIRD SCREEN = SCREEN CORRESPONDING TO TERTIARY COLOR
FOURTH SCREEN = SCREEN CORRESPONDING TO QUATERNARY COLOR

FIG. 5

EXAMPLES OF SCREEN RULING AND SCREEN ANGLE

| a | b | RULING (lpi) | ANGLE (deg) |
|---|---|---|---|
| 0 | 1 | 600 | 90 |
| 0 | 2 | 300 | 90 |
| 0 | 3 | 200 | 90 |
| 0 | 4 | 150 | 90 |
| 0 | 5 | 120 | 90 |
| 0 | 6 | 100 | 90 |
| 1 | 1 | 424 | 45 |
| 1 | 2 | 268 | 63 |
| 1 | 3 | 190 | 72 |
| 1 | 4 | 146 | 76 |
| 1 | 5 | 118 | 79 |
| 1 | 6 | 99 | 81 |
| 2 | 0 | 300 | 0 |
| 2 | 1 | 268 | 27 |
| 2 | 2 | 212 | 45 |
| 2 | 3 | 166 | 56 |
| 2 | 4 | 134 | 63 |
| 2 | 5 | 111 | 68 |
| 2 | 6 | 95 | 72 |
| 3 | 0 | 120 | 0 |
| 3 | 1 | 190 | 18 |
| 3 | 2 | 166 | 34 |
| 3 | 3 | 141 | 45 |
| 3 | 4 | 120 | 53 |
| 3 | 5 | 103 | 59 |
| 3 | 6 | 89 | 63 |
| 4 | 0 | 150 | 0 |
| 4 | 1 | 146 | 14 |
| 4 | 2 | 134 | 27 |
| 4 | 3 | 120 | 37 |
| 4 | 4 | 106 | 45 |
| 4 | 5 | 94 | 51 |
| 4 | 6 | 83 | 56 |
| 5 | 0 | 120 | 0 |
| 5 | 1 | 118 | 11 |
| 5 | 2 | 111 | 22 |
| 5 | 3 | 103 | 31 |
| 5 | 4 | 94 | 39 |
| 5 | 5 | 85 | 45 |
| 5 | 6 | 77 | 50 |
| 6 | 0 | 100 | 0 |
| 6 | 1 | 99 | 10 |
| 6 | 2 | 95 | 18 |
| 6 | 3 | 89 | 27 |
| 6 | 4 | 83 | 34 |
| 6 | 5 | 77 | 40 |
| 6 | 6 | 71 | 45 |

(PRINT RESOLUTION 600dpi)

FIG. 6A

HIGH RULING = SCREEN HAVING 200 LINES (lpi) OR MORE

| | RULING(lpi) | ANGLE 1(deg) | ANGLE 2(deg) | ANGLE 3(deg) | ANGLE 4(deg) |
|---|---|---|---|---|---|
| HIGH RULING | 600 | | | | |
| | 424 | 0 | | 90 | |
| | 300 | 45 | | 135 | |
| | 268 | 0 | 63 | 90 | 153 |
| | 212 | 27 | | 117 | |
| | 200 | 45 | | 135 | |
| | | 0 | | 90 | |

LOW RULING = SCREEN HAVING RULING LESS THAN 200 LINES (lpi)

| | RULING(lpi) | ANGLE 1(deg) | ANGLE 2(deg) | ANGLE 3(deg) | ANGLE 4(deg) |
|---|---|---|---|---|---|
| LOW RULING | 190 | 18 | 72 | 108 | 162 |
| | 166 | 34 | 56 | 124 | 146 |
| | 146 | 14 | 76 | 104 | 166 |
| | 141 | 45 | | 135 | |
| | 134 | 27 | 63 | 117 | 153 |
| | 120 | 37 | 53 | 127 | 143 |
| | 118 | 11 | 79 | 101 | 169 |
| | 111 | 22 | 68 | 112 | 158 |

420　421　422　423　424

EXAMPLE OF QUATERNARY COLOR INCLUDING K COLOR (FOURTH COLOR COMPONENT), 268 LINES, 63°

EXAMPLE OF PRIMARY COLOR BEING K COLOR (FIRST COLOR COMPONENT), 134 LINES, 63°

EXAMPLE OF TERTIARY COLOR INCLUDING K COLOR
(THIRD COLOR COMPONENT), 268 LINES, 27°

TERTIARY COLOR (CMK)

----- C
·········· M
——— K

EXAMPLE OF OPTIONS OF SCREEN (SCREEN RULING, SCREEN ANGLE)
CORRESPONDING TO PRIMARY COLOR

|  | RULING(lpi) | ANGLE(deg) |
|---|---|---|
| PRIMARY COLOR | 190 | 72 |
|  | 166 | 56 |
|  | 146 | 76 |
|  | 141 | 45 |
|  | 134 | 63 |
|  | 118 | 79 |
|  | 111 | 68 |

FIG. 12

EXAMPLE OF OPTIONS OF SCREEN (SCREEN RULING, SCREEN ANGLE) CORRESPONDING TO SECONDARY COLOR

| PRIMARY COLOR (FIRST COLOR COMPONENT) | | SECONDARY COLOR (SECOND COLOR COMPONENT) | | ANGLE DIFFERENCE |
|---|---|---|---|---|
| RULING(lpi) | ANGLE(deg) | RULING(lpi) | ANGLE(deg) | $\Delta$ deg |
| 190 | 72 | 190 | 108 | 36 |
| | | 166 | 124 | 52 |
| | | 146 | 104 | 32 |
| | | 141 | 135 | 63 |
| | | 134 | 117 | 45 |
| | | 111 | 112 | 40 |
| 166 | 56 | 190 | 108 | 52 |
| | | 166 | 124 | 68 |
| | | 146 | 104 | 48 |
| | | 141 | 135 | 79 |
| | | 134 | 117 | 61 |
| | | 120 | 127 | 71 |
| | | 118 | 101 | 45 |
| | | 111 | 112 | 56 |
| 146 | 76 | 190 | 108 | 32 |
| | | ⋮ | ⋮ | ⋮ |

FIG. 13A  FIG. 13B
EXAMPLES OF PRIMARY COLORS (CYAN) HAVING 166 LINES AND 146 LINES
CYAN: 166 LINES, 56°  MAGENTA: 146 LINES, 104°
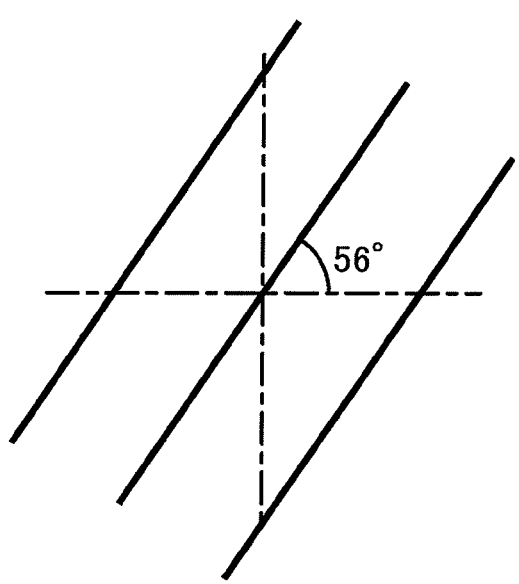
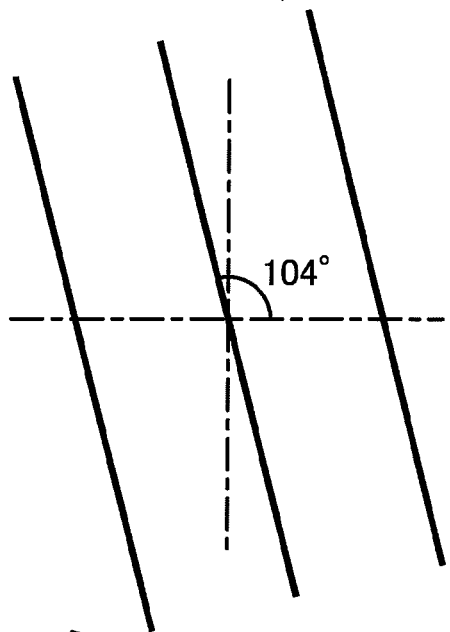
FIG. 13C
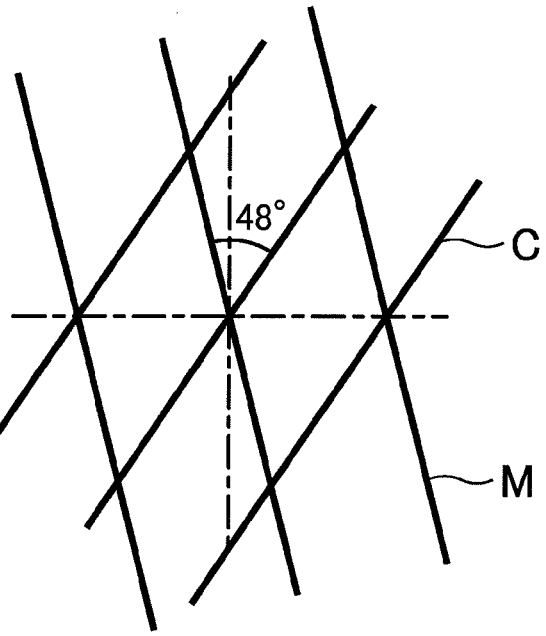

FIG. 14

EXAMPLE OF OPTIONS OF SCREEN (SCREEN RULING, SCREEN ANGLE) CORRESPONDING TO TERTIARY COLOR CONSISTING OF CMY

| PRIMARY COLOR (FIRST COLOR COMPONENT) 610 | | SECONDARY COLOR (SECOND COLOR COMPONENT) 620 | | TERTIARY COLOR (THIRD COLOR COMPONENT) 630 | | ANGLE DIFFERENCE 1 640 | ANGLE DIFFERENCE 2 650 |
|---|---|---|---|---|---|---|---|
| RULING(lpi) | ANGLE(deg) | RULING(lpi) | ANGLE(deg) | RULING(lpi) | ANGLE(deg) | Δ deg | Δ deg |
| 190 | 72 | 190 | 108 | | | | |
| | | 166 | 124 | | | | |
| | | 146 | 104 | : | : | : | : |
| | | 141 | 135 | : | : | : | : |
| | | 134 | 117 | | | | |
| | | 111 | 112 | | | | |
| 166 | 56 | 190 | 108 | | | | |
| | | | | : | : | : | : |
| | | | | : | : | : | : |
| | | 166 | 124 | | | | |
| | | | | : | : | : | : |
| | | | | : | : | : | 641 651 |
| | | 146 | 104 | 190 | 18 | 38 | 48 |
| | | | | 146 | 14 | 42 | 48 |
| | | | | 134 | 24 | 32 | 48 |
| | | | | 118 | 11 | 45 | 48 |
| | | | | 111 | 22 | 34 | 48 |
| | | | | : | : | : | : |
| | | | | : | : | : | : |
| 146 | 76 | 190 | 108 | | | | |
| : | : | : | : | | | | |
| : | : | : | : | | | | |

611　621　　　631

FIG. 15B
YELLOW: 146 LINES, 14°
FIG. 15A
SECONDARY COLOR (CM)
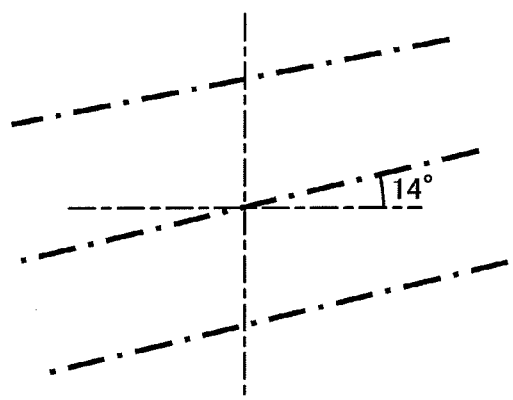
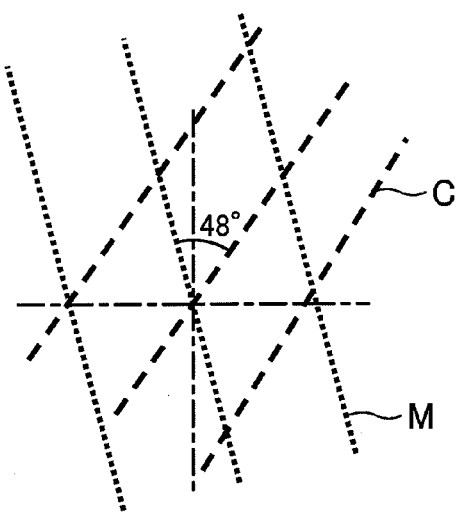
FIG. 15C
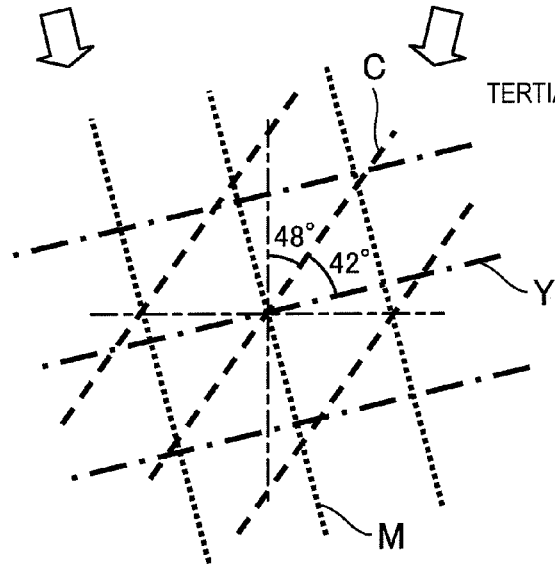
TERTIARY COLOR (CMY)
----- C
........... M
—·—· Y

EXAMPLE OF TERTIARY COLOR OF KCY

EXAMPLE OF TERTIARY COLOR OF KMY

FIG. 17

700 IMAGE DATA (%)

| | C 710 | M 720 | Y 730 | K 740 |
|---|---|---|---|---|
| DATA 1 | 20(#1) | 0 | 0 | 0 |
| DATA 2 | 40(#1) | 0 | 0 | 0 |
| DATA 3 | 60(#1) | 0 | 0 | 0 |
| DATA 4 | 80(#1) | 0 | 0 | 0 |
| DATA 5 | 100(#1) | 0 | 0 | 0 |
| DATA 6 | 20(#2) | 30(#1) | 0 | 0 |
| DATA 7 | 40(#2) | 50(#1) | 0 | 0 |
| DATA 8 | 60(#2) | 70(#1) | 0 | 0 |
| DATA 9 | 80(#2) | 90(#1) | 0 | 0 |
| DATA 10 | 20(#3) | 30(#2) | 40(#1) | 0 |
| DATA 11 | 40(#3) | 50(#2) | 60(#1) | 0 |
| DATA 12 | 60(#3) | 70(#2) | 80(#1) | 0 |
| DATA 13 | 80(#3) | 90(#2) | 100(#1) | 0 |
| DATA 14 | 20(#4) | 30(#3) | 40(#2) | 50(#1) |
| DATA 15 | 40(#4) | 50(#3) | 60(#2) | 70(#1) |
| DATA 16 | 60(#4) | 70(#3) | 80(#2) | 90(#1) |
| DATA 17 | 80(#4) | 90(#3) | 100(#2) | 100(#1) |

(#1) APPLY SCREEN FOR FIRST COLOR COMPONENT
(#2) APPLY SCREEN FOR SECOND COLOR COMPONENT
(#3) APPLY SCREEN FOR THIRD COLOR COMPONENT
(#4) APPLY SCREEN FOR FOURTH COLOR COMPONENT

FIG. 18

800 IMAGE DATA (%)

|  | C (810) | M (820) | Y (830) | K (840) |
|---|---|---|---|---|
| DATA 1 | 20(#1) | 0 | 0 | 0 |
| DATA 2 | 40(#1) | 0 | 0 | 0 |
| DATA 3 | 60(#1) | 0 | 0 | 0 |
| DATA 4 | 80(#1) | 0 | 0 | 0 |
| DATA 5 | 100(#1) | 0 | 0 | 0 |
| DATA 6 | 20(#2) | 30(#1) | 0 | 0 |
| DATA 7 | 40(#2) | 50(#1) | 0 | 0 |
| DATA 8 | 60(#2) | 70(#1) | 0 | 0 |
| DATA 9 | 80(#2) | 90(#1) | 0 | 0 |
| DATA 10 | 20(#2) | 30(#1) | 40(#3) | 0 |
| DATA 11 | 40(#2) | 50(#1) | 60(#3) | 0 |
| DATA 12 | 60(#2) | 70(#1) | 80(#3) | 0 |
| DATA 13 | 80(#2) | 90(#1) | 100(#3) | 0 |
| DATA 14 | 20(#3) | 30(#2) | 40(#4) | 50(#1) |
| DATA 15 | 40(#3) | 50(#2) | 60(#4) | 70(#1) |
| DATA 16 | 60(#3) | 70(#2) | 80(#4) | 90(#1) |
| DATA 17 | 80(#3) | 90(#2) | 100(#4) | 100(#1) |

(#1) APPLY SCREEN FOR FIRST COLOR COMPONENT
(#2) APPLY SCREEN FOR SECOND COLOR COMPONENT
(#3) APPLY SCREEN FOR THIRD COLOR COMPONENT
(#4) APPLY SCREEN FOR FOURTH COLOR COMPONENT

FIG. 19

900 IMAGE DATA (%)

| | C (910) | M (920) | Y (930) | K (940) |
|---|---|---|---|---|
| DATA 1 | 20(#1) | 0 | 0 | 0 |
| DATA 2 | 40(#1) | 0 | 0 | 0 |
| DATA 3 | 60(#1) | 0 | 0 | 0 |
| DATA 4 | 80(#1) | 0 | 0 | 0 |
| DATA 5 | 100(#1) | 0 | 0 | 0 |
| DATA 6 | 20(#2) | 30(#1) | 0 | 0 |
| DATA 7 | 40(#2) | 50(#1) | 0 | 0 |
| DATA 8 | 60(#2) | 70(#1) | 0 | 0 |
| DATA 9 | 80(#2) | 90(#1) | 0 | 0 |
| DATA 10 | 20(#2) | 30(#1) | 40(#3) | 0 |
| DATA 11 | 40(#2) | 50(#1) | 60(#3) | 0 |
| DATA 12 | 60(#2) | 70(#1) | 80(#3) | 0 |
| DATA 13 | 80(#2) | 90(#1) | 100(#3) | 0 |
| DATA 14 | 20(#3) | 30(#2) | 40(#4) | 50(#1) |
| DATA 15 | 40(#3) | 50(#2) | 60(#4) | 70(#1) |
| DATA 16 | 60(#3) | 70(#2) | 80(#4) | 90(#1) |
| DATA 17 | 80(#3) | 90(#2) | 100(#4) | 100(#1) |
| DATA 18 | 20(#3) | 30(#2) | 40(#4) | 30(#1) |
| DATA 19 | 40(#3) | 50(#2) | 60(#4) | 30(#1) |
| DATA 20 | 60(#3) | 70(#2) | 80(#4) | 30(#1) |
| DATA 21 | 80(#3) | 90(#2) | 100(#4) | 30(#1) |

(#1) APPLY SCREEN FOR FIRST COLOR COMPONENT
(#2) APPLY SCREEN FOR SECOND COLOR COMPONENT
(#3) APPLY SCREEN FOR THIRD COLOR COMPONENT
(#4) APPLY SCREEN FOR FOURTH COLOR COMPONENT

IMAGE PROCESSING DEVICE, IMAGE FORMING APPARATUS, AND NON-TRANSITORY COMPUTER READABLE RECORDING MEDIUM

CROSS-REFERENCE TO RELATED APPLICATIONS

This application is based on and claims priority under 35 USC 119 from Japanese Patent Application No. 2010-229946 filed on Oct. 12, 2010.

BACKGROUND

1. Technical Field

The invention relates to an image processing device, an image forming apparatus, an image processing method, an image forming method, a non-transitory computer readable recording medium.

2. Related Art

In an image forming apparatus such as a printer, a pulse-surface-area modulation using a screen (halftone dots) is adopted to represent tones of an output image. For example, for a tandem-type color printer, colors are represented by four plates (CMYK plates) of cyan (C), magenta (M), yellow (Y) and black (K) and different screens (screens having different angles, rulings, shapes and the like) are used for the respective four CMYK plates.

The reason why the different screens are used for the four CMYK plates is as follows. If a screen process is performed by using the same screen for the four plates, a defect (image quality defect) due to deviation of color registration (relative deviation of image positions when toner images of the respective colors are overlapped on an intermediate transfer belt), for example color unevenness (in-plane color unevenness) would be conspicuous.

SUMMARY

According to one aspect of the invention, an image processing device includes a processor. The processor executes a screen process by using different screens for respective color components which are newly used in response to N colors ranging from a primary color in an output color space to a Nth color, in the output color space, obtained by mixing the primary color with other primary colors in order, where N denotes natural number equal to or larger than 2.

BRIEF DESCRIPTION OF THE DRAWINGS

Exemplary embodiments of the invention will be described in detail below based on the accompanying drawings, wherein:

FIG. 1 is a block diagram showing a functional configuration of an image forming apparatus having an image processing device according to an exemplary embodiment of the invention;

FIG. 2 shows an example of screen information that is stored in a screen information storage section of the image processing device according to the exemplary embodiment of the invention;

FIG. 5 shows examples of a screen ruling and a screen angle according to a second example of the invention;

FIGS. 6A and 6B show examples of a screen having a high ruling and a screen having a low ruling according to the second example of the invention;

FIG. 12 shows examples of options of screen rulings and screen angles of two screens corresponding to a secondary color according to the third example of the invention;

FIGS. 13A to 13C shows an example of a screen process result in the case where two screens having screen rulings of 166 and 146 lines are used for a secondary color according to the third example of the invention;

FIG. 14 shows examples of options of screen rulings and screen angles of three screens corresponding to a tertiary color (cyan, magenta and yellow) according to the third example of the invention;

FIGS. 15A to 15C show an example of a screen process result in the case where three screens are used for the tertiary color (cyan, magenta and yellow) according to a third example of the invention;

FIG. 17 illustrates screen(s) applied to a color(s) of image data to be processed based on a data amount of image data to be processed according to a fourth example of the invention;

FIG. 18 illustrates screen(s) applied to a color(s) of image data to be processed based on a data amount of image data to be processed according to a fifth example of the invention;

FIG. 19 illustrates screen(s) applied to a color(s) of image data to be processed based on a data amount of image data to be processed according to a sixth example of the invention.

DETAILED DESCRIPTION

Figure 3:
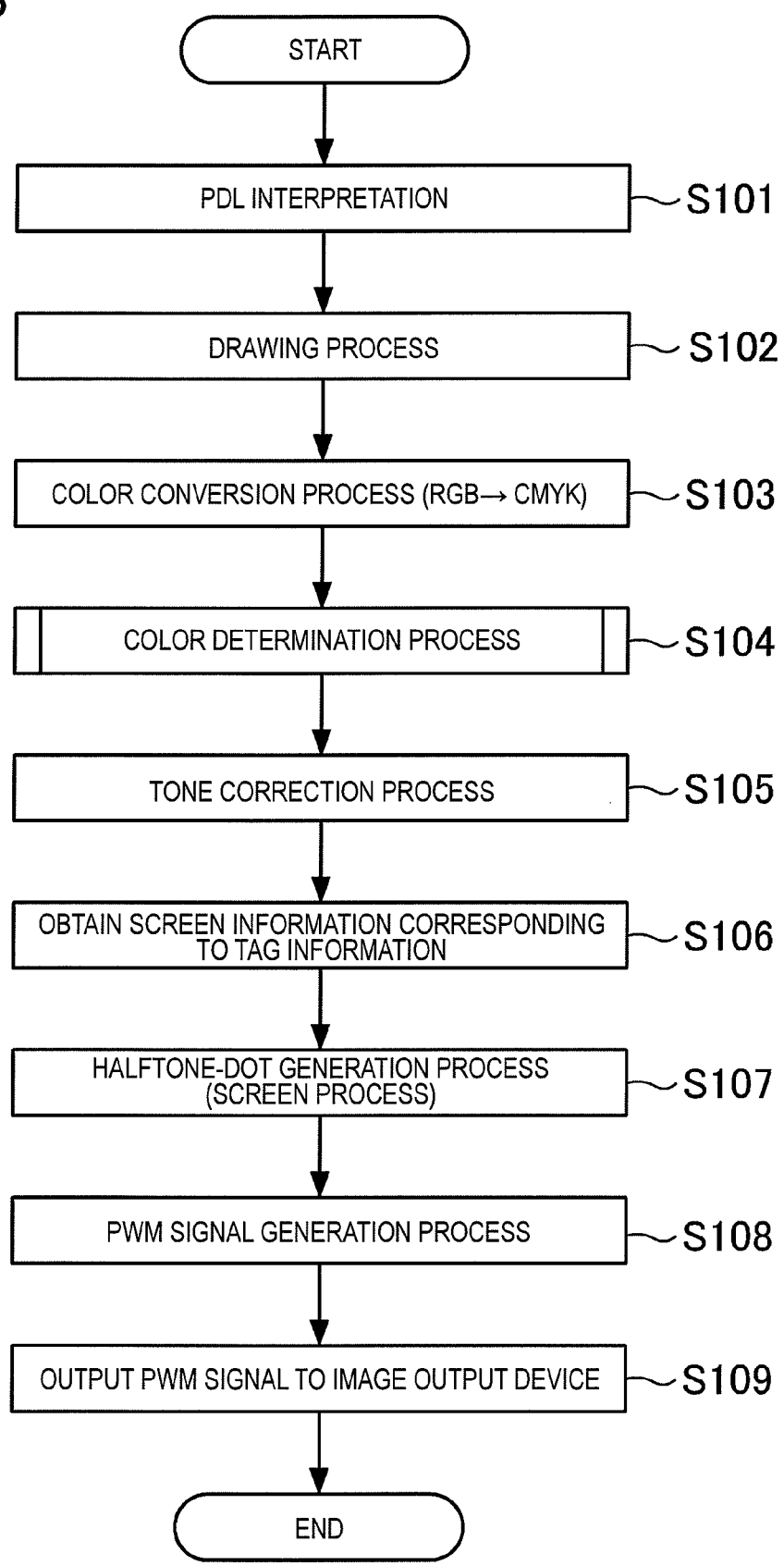
FIG. 3 is a flowchart showing a process procedure of image processing executed by the image processing device according to the exemplary embodiment of the invention.

Hereinafter, exemplary embodiments of the invention will be specifically described with reference to the accompanying drawings. In the drawings for describing the exemplary embodiments, the same constitutional element is indicated with the same reference numeral, and the repeated descriptions thereon will be omitted.

An image forming apparatus having an image processing device according to an exemplary embodiment will be described with reference to FIG. 1.

As shown in FIG. 1, the image forming apparatus 1 has the image processing device 10 and an image output device 20.

The image processing device 10 has a PLD interpretation section 110, a drawing section 120, a color conversion section 130, a color determination section 140, a tone correction section 150, a halftone-dot generation section 160, a screen information storage section 170 and a PWM process section 180.

The PLD interpretation section 110 interprets print data, for example, data described in the page description language (hereinafter, referred to as 'PDL data'), which is output and obtained from a computer that issues a print request, and outputs an interpretation result to the drawing section 120.

The print data from the computer is image data that is represented in the RGB color space or the L*a*b color space. Here, it is assumed that the print data is data represented in the RGB color space (hereinafter, referred to as 'RGB data'), that is, PDL data.

The RGB color space means a color space consisting of red, green and blue. Also, the L*a*b color space is a color space (uniform color space) that does not depend on a device such as an image output device, and means a color space of the CIE (Commission Internationale de l'Eclairage) L*a*b color system, for example.

The drawing section 120 executes a drawing process in drawing process units (for example, in units of pages), based on the received interpretation result of the PDL data, and outputs a result of the drawing process to the color conversion section 130. The result (drawing data) of the drawing process by the drawing section 120 is data (raster data) of each color of RGB in a raster format.

Examples of the raster data includes not only data of a complete bitmap state but also data in a format which is so called an intermediate language and may be any data that is generated by interpreting the PDL.

Based on color conversion information such as color conversion table (three dimensional lookup table), for example, the color conversion section 130 converts (color converts) the RGB data (raster data of each color of RGB), which is the result of the drawing process by the drawing section 120, into data (image data) that is expressed in a CMY color space or a CMYK color space which is an output color space, that is, a color space (color space depending on the image output device) suitable for image formation and image output by the image output device 20.

The CMY color space means a color space consisting of cyan, magenta and yellow. Also, the CMYK color space means a color space consisting of ¥cyan, magenta, yellow and black.

Here, the color conversion section 130 is adapted to color covert the RGB data into data in the CMYK color space (hereinafter, referred to as 'CMYK data').

The color-converted CMYK data is output plane information of cyan, magenta, yellow and black. The respective output plane information of the four colors (C, M, Y and K) includes information indicating ON (there is a dot) or OFF (there is no dot) for each pixel and information indicating a tone value of a pixel for which the information indicates ON.

Pixel data of each pixel in the four output plane information is represented by the CMYK data. Also, if the information indicating ON for a certain pixel is included in one or more the output plane information, the certain pixel is any one of a primary color, a secondary color, a tertiary color and a quaternary color.

Based on the information, for each pixel in the four output plane information, indicating ON, the color determination section 140 performs a color determination process of determining as to whether the pixel data of each pixel is a primary color, a secondary color, a tertiary color or a quaternary color.

Also, the color determination section 140 outputs to the tone correction section 150 the pixel data (CMYK data) of each of the pixels for which the color determination process has been performed, and Tag information that is obtained from the determination result for each pixel.

The color determination process of the color determination section 140 will be specifically described later.

Of the information received from the color determination section 140, the tone correction section 150 performs a tone correction for the color-converted pixel data (CMYK data) based on tone reproduction characteristic curve (TRC: Tone Reproduction Curve).

Also, the tone correction section 150 outputs to the halftone-dot generation section 160 the CMYK data for which the tone correction is performed and the Tag information received from the color determination section 140.

The halftone-dot generation section 160 has a function of an execution unit, reads out screen information from the screen information storage section 170 in accordance with the Tag information, which is received from the tone correction section 150, and performs a halftone-dot generation process (screen process) for the tone-corrected image data received from the tone correction section 150, based on the screen information.

Also, the halftone-dot generation section 160 outputs to the PWM process section 180 the CMYK data for which the halftone-dot generation process (screen process) is performed.

The screen information storage section 170 stores the screen information for each of the Tag information corresponding to the primary color, the secondary color, the tertiary color and the quaternary color.

The screen information, which is stored in the screen information storage section 170, will be specifically described later.

The PWM process section 180 generates, based on the CMYK data for which the screen process is performed, pulse signals having pulse widths corresponding to tones of the CMYK data, that is, pulse signals (pulse signal data) by the pulse width modulation (PWM). These pulse signal data serve as video signal data for turning on a laser that is oscillated from an image forming section 220 of the image output device 20, which will be described later.

The image output device 20 has an image output device control section 210 and an image forming section 220.

The image output device control section 210 controls the entire image output device 20 and controls the image forming process based on the pulse signals (PWM signal), which are output from the image processing device 10 and correspond to an image of a page unit, for example.

The image forming section 220 has a function of a forming unit, executes the image forming process based on the pulse signal (PWM signal data) output from the image processing device 10 under the control of the image output device control section 210, and outputs a printing medium (for example, a sheet of paper having a color image printed thereon) that is a result of the image forming process.

In this exemplary embodiment, the image forming section 220 has a function of executing the image forming process to form a color image by the electrophotography method (electrophotography process). The electrophotography process includes a charging process, an exposing process, a developing process, a transfer process, a fixing process, a charge eliminating process and a cleaning process.

Specifically, the image forming section 220 has plural image forming units (not shown) that forms toner images of the respective color components of cyan (C), magenta (M), yellow (Y) and black (K) and a primary transfer roll (not shown) that serves as a primary transfer section of sequentially transferring (primarily transferring) the toner images of the respective color components formed by the respective image forming units on an intermediate transfer medium (intermediate transfer belt).

Also, the image forming section 220 has a secondary transfer section (not shown) that collectively transfers (secondarily transfers) the toner images (overlapped toner images), which have been transferred onto the intermediate transfer medium, onto a sheet P (which is an example of a recording medium), and a fuser that heats and pressurizes the sheet having the overlapped toner images transferred thereon, thereby fixing the overlapped toner images on the sheet. The sheet that has been subject to the fixing process is output toward a sheet receiving section (not shown).

The process of forming the toner images by the plural image forming units corresponds to the charging process, the exposing process and the developing process. The process of transferring the toner images by the primary transfer roll and transferring the overlapped toner images by the secondary transfer unit corresponds to the transfer process, and the process of fixing the overlapped toner images by the fuser corresponds to the fixing process.

As described above, the image output device 20 is an image output device of tandem-type and intermediate transfer type.

Next, the screen information, which is stored in the screen information storage section 170, will be described with reference to FIG. 2.

As shown in FIG. 2, the screen information 300 includes respective items of a Tag 310 and a screen 320.

In the item of the Tag 310, Tag information (Tag value) of any one of values '0' to '3' is registered. In the Tag information, the value '0' corresponds to the primary color, the value '1' corresponds to the secondary color, the value '2' corresponds to the tertiary color and the value '3' corresponds to the quaternary color.

In the item of the screen 320, screen information for the primary color associated with the Tag value '0', screen information for the secondary color associated with the Tag value '1', screen information for tertiary color associated with the Tag value '2' and screen information for quaternary color associated with the Tag value '3' are registered.

As shown in a row 301, the screen information for primary color has a first screen 321. The primary color is any color component (first color component) of cyan (C), magenta (M), yellow (Y) and black (K). It can be said that the color component (first color component) is a new color component which is newly used in the primary color. The first screen 321 is a screen corresponding to the first color component (new color component).

As shown in a row 302, the screen information for secondary color has the first screen 321 and a second screen 322. The secondary color is a color that is obtained by mixing the primary color (first color component) and a second color component. It can be said that the second color component is a new color component which is newly used in the secondary color. The second screen 322 is a screen corresponding to the second color component (new color component).

As shown in a row 303, the screen information for tertiary color has the first screen 321, the second screen 322 and a third screen 323. The tertiary color is a color that is obtained by mixing the secondary color (the mixed color of the first color component and the second color component) and a third color component. It can be said that the third color component is a new color component which is newly used in the tertiary color. The third screen 323 is a screen corresponding to the third color component (new color component).

As shown in a row 304, the screen information for quaternary color has the first screen 321, the second screen 322, the third screen 323 and a fourth screen 324. The quaternary color is a color that is obtained by mixing the tertiary color (the mixed color of the first color component, the second color component and the third color component) and a fourth color component. It can be said that the fourth color component is a color component which is newly used in the quaternary color. The fourth screen 324 is a screen corresponding to the fourth color component (new color component).

Each of the first screen 321, the second screen 322, the third screen 323 and the fourth screen 324 has a ruling (lpi; lines per inch) and an angle (degree).

Furthermore, the first screen 321, the second screen 322, the third screen 323 and the fourth screen 324 are different screens for the respective new color components, i.e., different screens corresponding to the respective four color components.

Here, paying attention to the tertiary color, which is obtained by mixing cyan (C), magenta (M) and yellow (Y), when it is assumed that yellow of the first color component is a primary color, a second color is obtained by mixing the primary color and magenta of a second color component, and a tertiary color is obtained by mixing the secondary color and cyan of a third color component, for example.

In this case, the first screen 321 is used for yellow of the first color component, the second screen 322 is used for magenta of the second color component, and the third screen 323 is used for cyan of the third color component.

Also, paying attention to the tertiary color of the above case, when it is assumed that magenta of the first color component is a primary color, a second color is obtained by mixing the primary color and cyan of a second color component, and a tertiary color is obtained by mixing the secondary color and yellow of a third color component, for example.

In this case, the first screen 321 is used for magenta of the first color component, the second screen 322 is used for cyan of the second color component, and the third screen 323 is used for yellow of the third color component.

As described above, in this exemplary embodiment, the different screens are used for the new color components which are newly used in the primary color, the secondary color, the tertiary color and the quaternary color, respectively, rather than different screens are used for the respective colors (respective color plates) of cyan (C), magenta (M), yellow (Y) and black (K).

In the example in which the three screens corresponding to the tertiary color obtained by mixing cyan (C), magenta (M) and yellow (Y) are selected, a condition indicating which color (color component) of cyan (C), magenta (M) and yellow (Y) should be applied to each of the first color component of the primary color, the second color component of the secondary color and the third color component of the tertiary color is determined in advance.

In this exemplary embodiment, a condition (hereinafter, referred to as 'color applying condition') indicating which colors (color components) of cyan (C), magenta (M), yellow (Y) and black (K) should be applied to two color components of the secondary color, three color components of the tertiary color and four color components of the quaternary color is determined in advance.

In other words, a color applying condition indicating which color (color component) of respective color components of an actual secondary color should be applied to two color components of the secondary color, that is, the first color component of the primary color and the second color component of the secondary color is determined.

Also, a color applying condition indicating which color (color component) of respective color components of an actual tertiary color should be applied to three color components of the tertiary color, that is, the first color component of the primary color, the second color component of the secondary color and the third color component of the tertiary color is determined.

Further, a color applying condition indicating which color (color component) of respective color components of an actual quaternary color should be applied to four color components of the quaternary color, that is, the first color component of the primary color, the second color component of the secondary color, the third color component of the tertiary color and the fourth color component of the quaternary color is determined.

A specific example of the color applying condition will be described later.

Next, the image processing of the image processing device 10 will be described with reference to FIG. 3.

When print data (PDL data) of RGB is output from the computer (not shown) which requests a print operation to the image forming apparatus 1, the PLD interpretation section 110 of the image processing device 10 obtains and interprets the print data (PDL data) of RGB (step S101) and outputs the interpretation result to the drawing section 120, as shown in FIG. 3.

The drawing section 120 performs the drawing process in units of processes relating to the drawing (for example, in units of pages) based on the received interpretation result of the PDL data (step S102) and outputs a result of the drawing process, i.e., raster data (raster data of each color of RGB) to the color conversion section 130.

The color conversion section 130 converts (color converts) RGB data (raster data of each color of RGB) in the RGB color space which is the result of the drawing process by the drawing section 120 into CMYK data in the CMYK color space which is the output color space, based on, for example, the color conversion information of the color conversion table (three dimensional lookup table) (step S103).

The color-converted CMYK data corresponds to the unit of the processes (for example, page) relating to the drawing process by the drawing section 120 and is output plane information for the respective colors of cyan (C), magenta (M), yellow (Y) and black (K).

Based on the information, for each pixel in the four output plane information corresponding to the unit of the process (for example, page), indicating ON, the color determination section 140 performs the color determination process of determining whether pixel data of each pixel is the primary color, secondary color, tertiary color or quaternary color (step S104).

Also, the color determination section 140 outputs to the tone correction section 150 the CMYK data of each of the pixels for which the color determination process is performed and the Tag information corresponding to the result of the color determination process for each pixel.

Of the information received from the color determination section 140, the tone correction section 150 performs a tone correction for the color-converted CMYK data based on tone reproduction characteristic curve (TRC) (step S105).

Then, the tone correction section 150 outputs the tone-corrected CMYK data and the Tag information received from the color determination section 140 to the halftone-dot generation section 160.

The halftone-dot generation section 160 obtains the screen information associated with the Tag information (any of values '0' to '3'), which is received from the tone correction section 150, from the screen information storage section 170 (step S106). In this case, the screen information for any of the primary color, secondary color, tertiary color and quaternary color is obtained for each pixel in the process unit (for example, page).

Then, the halftone-dot generation section 160 performs the halftone-dot generation process (screen process) for the tone-corrected CMYK data, which is received from the tone correction section 150, based on the screen information obtained in step S106 (step S107).

Then, the halftone-dot generation section 160 outputs the CMYK data for which the halftone-dot generation process (screen process) is performed to the PWM process section 180.

The PWM process section 180 generates pulse signal data (PWM signal data) by the pulse width modulation (PWM) corresponding to the tones of the data of each color (step S108).

Then, the PWM process section 180 outputs the generated pulse signal data (PWM signal data) to the image output device 20 (step S109). In this case, the pulse signal data (PWM signal data) is output for each color of CMYK.

Then, in the image output device 20, the image forming section 220 executes the image forming process based on the pulse signal data (PWM signal data) for each color of CMYK output from the image processing device 10 under the control of the image output device control section 210, and outputs a printing medium (for example, a sheet of paper having a color image printed thereon) which is a result of the image forming process.

Next, the color determination process performed by the color determination section 140 of the image processing device 10 will be described with reference to FIG. 4.

Figure 4:
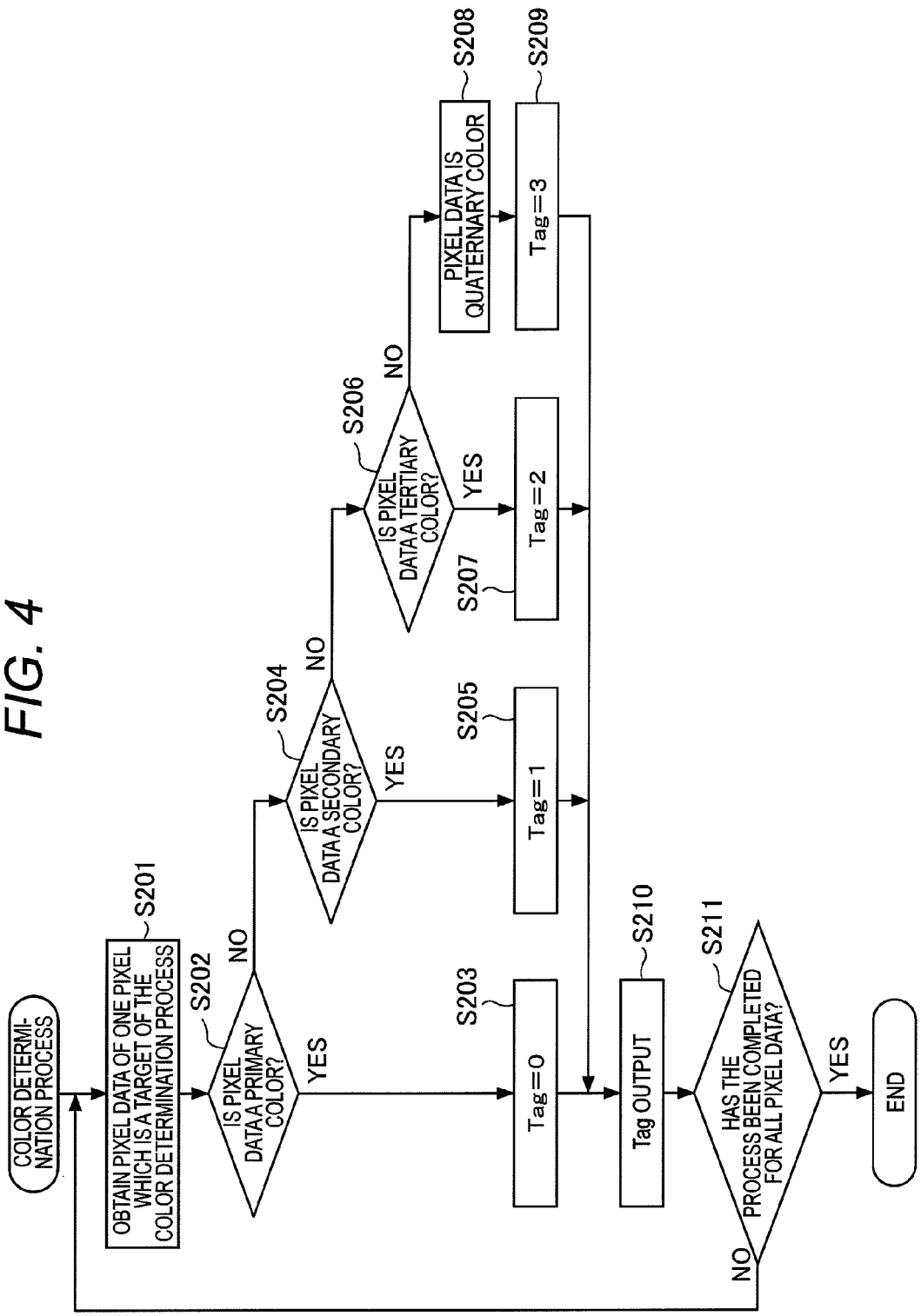
FIG. 4 is a flowchart showing a process procedure of a color determination process executed by a color determination section of the image processing device according to the exemplary embodiment of the invention.

As shown in FIG. 4, the color determination section 140 obtains pixel data of one pixel, which a target of the color determination process, in the four output plain information (each output plain information of C, M, Y and K), which are the result of the color conversion processing by the color conversion section 130 and which corresponds to the process unit (for example, page) of the drawing process performed by the drawing section 120 (step S201).

The color determination section 140 determines as to whether or not the obtained pixel data is a primary color (step S202). If it is determined that the pixel data is a primary color, the color determination section 140 makes a value of Tag zero (Tag=0) (step S203). Otherwise, the color determination section 140 determines as to whether or not the obtained pixel data is a secondary color (step S204).

In step S204, if the color determination section 140 determines that the obtained pixel data is a secondary color, it makes a value of Tag one (Tag=1) (step S205). On the other hand, if the obtained pixel data is not a secondary color, the color determination section 140 determines as to whether or not the obtained pixel data is a tertiary color (step S206).

In step S206, if the color determination section 140 determines that the obtained pixel data is a tertiary color, it makes a value of Tag two (Tag=2) (step S207). On the other hand, if the obtained pixel data is not a tertiary color, the color determination section 140 determines that the obtained pixel data is a quaternary color (step S208) and makes a value of Tag three (Tag=3) (step S209).

When the color determination section 140 completes any one of step S203, step S205, step S207 and step S209, it outputs the Tag information (the value of Tag) to the tone correction section 150 together with the pixel data (CMYK data) of the one pixel, which is the target of the color determination in step S201 (step S210).

The color determination section 140 as to determines whether or not the color determination process has been performed for all the pixel data in the process unit (for example, page) of the drawing process (step S211). If it is determined that there remains pixel data for which the color determination process has not been performed, the color determination section 140 returns to step S201. On the other hand, if it is determined that the color determination process has been performed for all the pixel data, the color determination section 140 ends this process.

The descriptions of the color determination process for all the pixels (pixel data) in the process unit (for example, page) of the drawing process have been completed. If the print data is data of plural pages (for example, P pages), the color determination process is repeated in plural times (for example, P times).

FIRST EXAMPLE

An example will be described in which the screen process is performed by applying a first color applying condition (which will be described in detail later) to three color components of the tertiary color obtained by mixing cyan (C), magenta (M) and black (K).

In this case, the first color applying condition is such that actual colors of the tertiary color are determined in advance so as to correspond to three color components of the tertiary color, i.e., the first color component, the second color component and the third color component. For example, according to the first color applying condition, for the tertiary color obtained by mixing cyan (C), magenta (M) and black (K), 'the first color component, the second color component and the third color component' adopt one combination which is selected in advance from among 'C, M, K', 'C, K, M', 'M, C, K', 'M, K, C', 'K, C, M' and 'K, M, C.' In the first example, the first color applying condition is 'C, M, K', that is, the first color component is cyan (C), the second color component is magenta (M) and the third color component is black (K).

Accordingly, when the halftone-dot generation section 160 receives the Tag information (=2) and the CMK data (raster data) as the tone-corrected data (pixel data), it performs the screen process by applying the first screen 321 to cyan (cyan data), the second screen 322 to magenta (magenta data) and the third screen 323 to black (black data) in adopting the screen information for tertiary color associated with the Tag information (Tag=2) from the screen information 300 stored in the screen information storage section 170, which is shown in FIG. 2.

Similarly to the first color applying condition for three color components of the tertiary color, the first color applying condition for two color components of the secondary color and the first color applying condition for four color components of the quaternary color also adopt particular combinations from various combinations.

Also, with regard to the color applying condition for the primary color, in any case where the primary color is one of cyan (C), magenta (M), yellow (Y) and black (K), the first color component is the one of cyan (C), magenta (M), yellow (Y) and black (K). As a result, for the primary color, the first screen information 321, which is the screen information for primary color, is applied.

SECOND EXAMPLE

FIG. 5 shows examples of the screen ruling and the screen angle.

Here, the examples of the screen ruling and the screen angle are shown for a print resolution of 600 dpi.

In FIG. 5, one screen has a set of a screen ruling and a screen angle which correspond to a value described in an item of a screen ruling (lpi) 401 and a value described in an item of an angle (deg) 402, respectively.

Each value described in the item of the angle (deg) 402 is obtained based on values described in items of 'a' 403 and 'b' 404.

In other words, when 'a tan' denotes arctangent, a result (θ [deg]) obtained by calculating a tan(a/b) is a value that is described in the item of the angle (deg) 402. Here, 'a' in a tan (a/b) is a value that is described in the item of 'a' 403, and 'b' is a value that is described in the item of 'b' 404 (see FIG. 7).

The screens include two types of screens, i.e., screens each having a high ruling and screens each having a low ruling. FIGS. 6A and 6B show examples of screens having high screen rulings and screens having low screen rulings, for a line screen.

Here, rulings (screen rulings) of 200 lines (lpi) or greater are referred to as high rulings and rulings (screen rulings) less than 200 lines (lpi) are referred to as low rulings.

In the second example, the screen information storage section 170 stores the screen information shown in FIGS. 6A and 6B in addition to the screen information 300 shown in FIG. 2.

The screen information shown in FIGS. 6A and 6B includes the screens having high screen rulings shown in FIG. 6A and the screens having low screen rulings shown in FIG. 6B.

Here, the example of the screen information (screens having high rulings and screens having low rulings) is described for the print resolution of 600 dpi.

As shown in FIG. 6A, for the screens with high rulings, values described in respective items of 'angle 1 (deg)' 411, 'angle 2 (deg)' 412, 'angle 3 (deg)' 413 and 'angle 4 (deg)' 414 are applied in response to values (rulings) described in an item of 'ruling (lpi)' 410.

Also, as shown in FIG. 6B, for the screens with low rulings, values described in respective item of 'angle 1 (deg)' 421, 'angle 2 (deg)' 422, 'angle 3 (deg)' 423 and 'angle 4 (deg)' 424 are applied in response to values (rulings) described in an item of 'ruling (lpi)' 420, like the screens with high rulings.

As can be seen from FIGS. 6A and 6B, in the case of the line screen, the number of the angle components for one ruling is four at maximum (angle 1 to angle 4).

For example, for the screen having a high ruling, 27°, 63°, 117° and 153° are applied in response to the 268 lines, for example. Also, for the screen with a low ruling, 34°, 56°, 124° and 146° are applied in response to the 166 lines, for example.

Figures 7A, 7B, 7C, 7D:
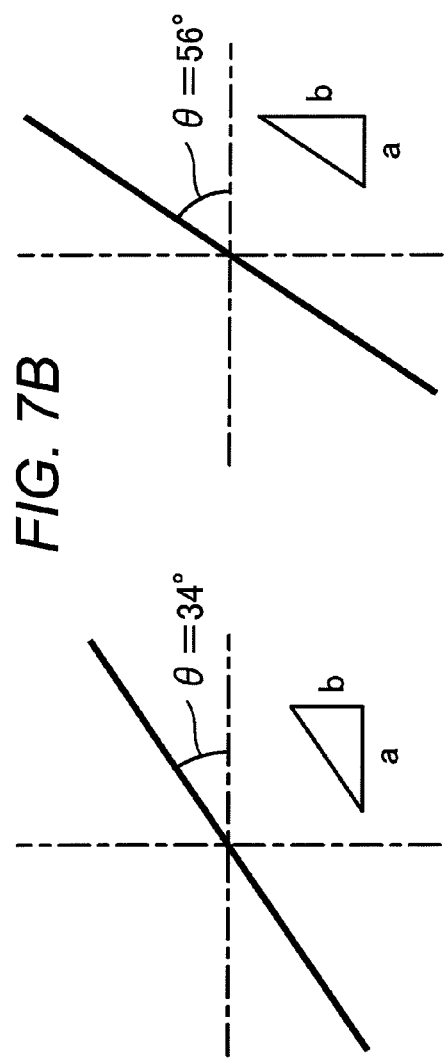
FIGS. 7A to 7D illustrate screen angles for the screen having a low ruling (screen ruling: 166 lines) according to the second example of the invention.

Here, line screens having a ruling (lpi) of 166 lines and angles (deg) of 34°, 56°, 124° and 146° are shown in FIGS. 7A to 7D. FIG. 7A indicates the line screen having the angle of 34°, FIG. 7B indicates the line screen having the angle of 56°, FIG. 7C indicates the line screen having the angle of 146° and FIG. 7D indicates the line screen having the angle of 124°.

The line screen shown in FIG. 7A and the line screen shown in FIG. 7C have different directions of their slopes. However, results (angle=θ) which are obtained through calculation of a tan(b/a) are 34°. Also, the line screen shown in FIG. 7B and the line screen shown in FIG. 7D have different direction of their slopes. However, results (angle=θ) which are obtained through calculation of a tan(b/a) are 56°.

The first screen 321, the second screen 322, the thirds screen 323 and the fourth screen 324 of the screen information 300 shown in FIG. 2 are selected from the screens having high rulings shown in FIG. 6A and the screens having low rulings shown in FIG. 6B. In this example, the screens are selected from the screens having low rulings.

Next, examples will be described in which when black (K) is included in the primary color, the secondary color, the tertiary color and the quaternary color, the screen process is performed using the screens, which are obtained by applying the first color applying condition.

In this case, for the screen of black plate, when black is the primary color, a screen having a low ruling is used, and when black is a color component included in any one of the secondary color, the tertiary color and the quaternary color, a screen having a high ruling is used.

Here, examples will be described; one where the screen process is performed by applying the first color applying condition to one color component of the primary color being black; and another where the screen process is performed by applying the first color applying condition to four color components of the quaternary color including black (K).

When the halftone-dot generation section 160 receives the Tag information (Tag=0) and the K data (raster data) as the tone-corrected data (pixel data) from the tone correction section 150, it selects, for the screen of black plate, a specific screen from the screens having low rulings shown in FIG. 6B among the screen information of FIGS. 6A and 6B stored in the screen information storage section 170, which is shown in FIG. 2, and performs the screen process by using the selected specific screen.

Figure 8B:
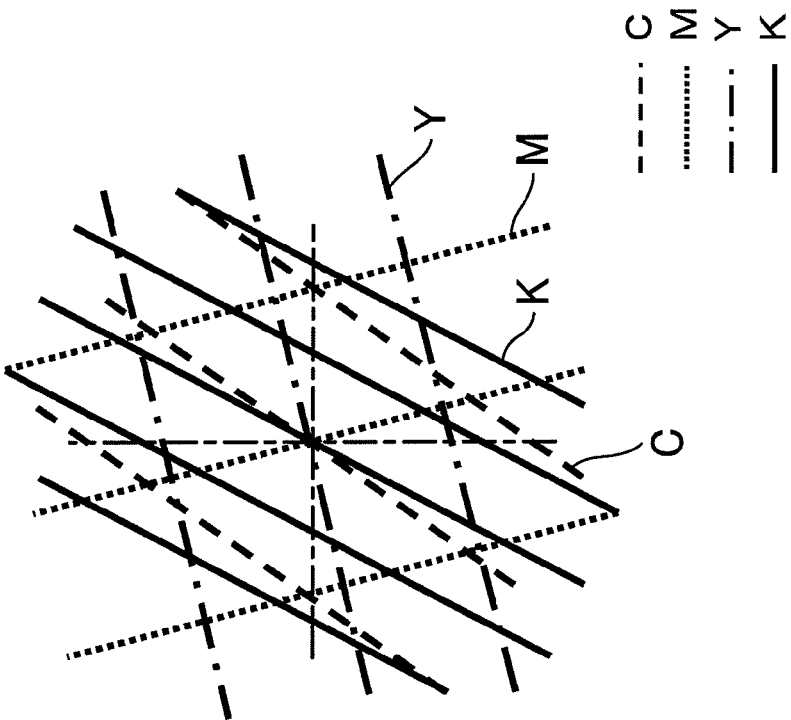
FIG. 8B shows an example of a screen process result in the case where a screen having a high ruling is used for black of a quaternary color (quaternary color including black) according to the second example of the invention.
Figure 8A:
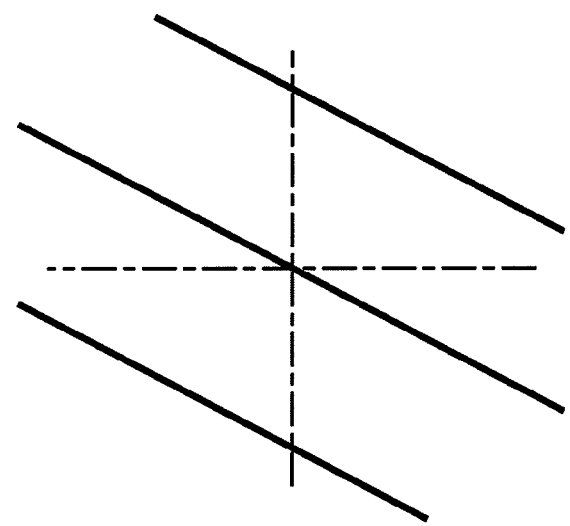
FIG. 8A shows an example of a screen process result in the case where a screen having a low ruling is used for black of a primary color according to the second example of the invention.

It is assumed that the screen having the ruling of 134 lines described in the item of the ruling (lpi) 420 and the angle of 63° are selected. The result of the screen process using this screen is shown in FIG. 8A.

Also, when the halftone-dot generation section 160 receives the Tag information (Tag=3) and the CMYK data (raster data) as the tone-corrected data (pixel data) from the tone correction section 150, it selects, for the screen of black plate, a specific screen from the screens with high rulings shown in FIG. 6A of the screen information of FIG. 6 stored in the screen information storage section 170 shown in FIG. 2, and performs the screen process by using the selected specific screen.

It is assumed that a screen having the ruling of 268 lines described in the item of the ruling (lpi) 410 and the angle of 63° are selected as the specific screen. The result of the screen process using this specific screen is shown in FIG. 8B.

Even when black (K) included in the quaternary color corresponds to any one color component of the first color component, the second color component, the third color component and the fourth color component according to the first color applying condition, a screen having a high ruling is adopted.

For example, when black (K) corresponds to the third color component according to the first color applying condition, a screen having a high ruling of 268 lines and a screen angle of 63° is used. Then, for the other first color component, second color component and fourth color component, the first screen 321, second screen 322 and fourth screen 324 for quaternary color are used among the screen information 300 stored in the screen information storage section 170 shown in FIG. 2.

In the case where the screen process is performed by applying the first color applying condition to the three color components of the tertiary color including black (K), the screen process is also performed in the same manner as that for the quaternary color including black (K).

In other words, for the tertiary color having the respective color components of cyan (C), magenta (M) and black (K), when the halftone-dot generation section 160 receives the Tag information (Tag=2) and the CMK data (raster data) as the tone-corrected data (pixel data) from the tone correction section 150, it selects, for the screen of black plate, a specific screen from the screens with high rulings shown in FIG. 6A of the screen information of FIG. 6 stored in the screen information storage section 170 shown in FIG. 2, and performs the screen process by using this selected specific screen.

Even when black (K) included in the tertiary color corresponds to any one color component of the first color component, the second color component and the third color component according to the first color applying condition, a screen with a high ruling is adopted.

Figures 9, 10:
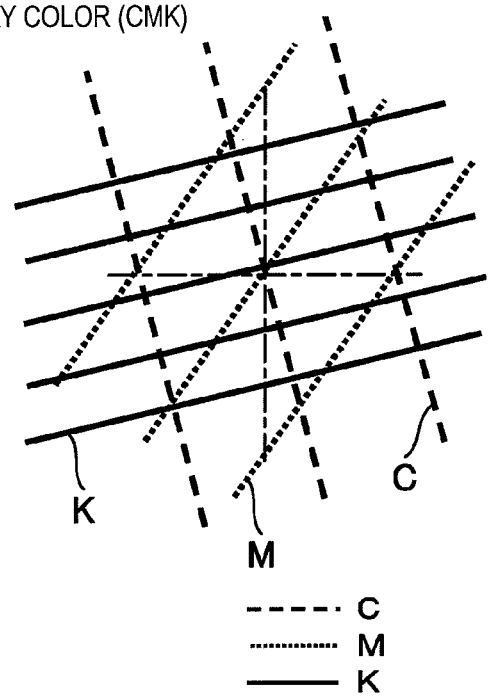
FIG. 9 shows an example of a screen process result in the case where a screen having a high screen ruling is used for black of a tertiary color (tertiary color including black) according to the second example of the invention.
FIG. 10 shows examples of options of a screen ruling and a screen angle of one screen corresponding to a primary color according to a third example of the invention.

It is assumed that a screen having the ruling of 268 lines described in the item of the ruling (lpi) 410 and the angle of 27° are selected. The result of the screen process using the screen is shown in FIG. 9.

In the second example, as described above, for the screen of black plate, if black corresponds to the primary color, a screen with a low ruling is used, and if black corresponds to a color component included in any one of the secondary color, the tertiary color and the quaternary color, a screen with a high ruling is used. In this case, the screen angle is of little importance.

Specifically, among cyan (C), magenta (M), yellow (Y) and black (K), for the screen of black plate that is most apt to cause moiré due to the screen interference (hereinafter, referred to as 'screen interference moiré'), a screen of a high ruling is used. Thereby, the screen interference moiré is reduced in an image part of multicolor such as the secondary color, the tertiary color and the quaternary color.

As described above, when a screen of a high ruling is used as the screen of black plate, it is permissible that the other screens corresponding to cyan (C), magenta (M) and yellow (Y) are close to the screen of black plate. If the screen angle of the screen of black plate is equal to or greater than a predetermined screen angle, for example 45°, the screen angles of the screens corresponding to the other colors may be close to 45°. Thereby, the screen interference moiré and/or banding (horizontal stripe) is reduced in an image part of multicolor such as the secondary color, the tertiary color and the quaternary color.

THIRD EXAMPLE

Next, other examples of the screens of the first screen 321, the second screen 322 and the third screen 323 in the screen information 300 shown in FIG. 2 will be described.

First, examples of options of the screen (screen ruling, screen angle) corresponding to the primary color, i.e., first color component are shown in FIG. 10. Among the options (plural screens), a specific screen is selected. It is noted that the first screen 321 of the screen information 300 is obtained by selecting a screen having a ruling of 166 lines and an angle of 56° from the options shown in FIG. 10.

In this example, as shown in FIG. 10, for the primary color, i.e., the first color component, screens having a predetermined angle or greater, for example 45° or greater are used.

Thereby, generation of banding (horizontal stripe) is suppressed in any primary color of cyan (C), magenta (M), yellow (Y) or black (K).

Figure 11:
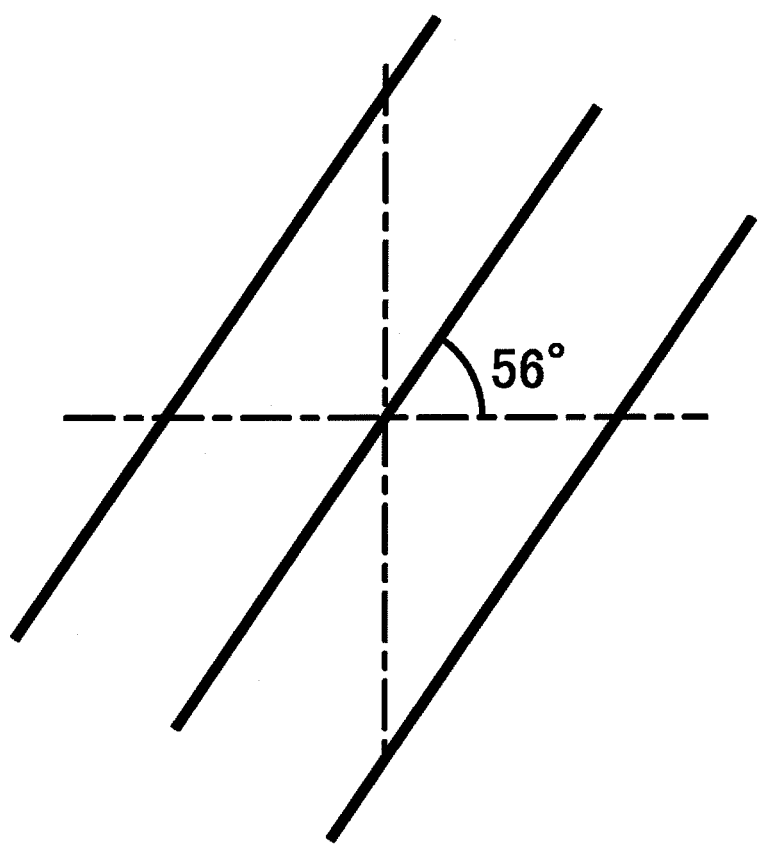
FIG. 11 shows an example of a screen process result in the case where a screen having a screen ruling of 166 lines and a screen angle of 36° is used for a primary color according to the third example of the invention.

A result of the screen process in which the screen having the ruling of 166 lines and the angle of 56° are used as the screen for the primary color of cyan (C) is shown in FIG. 11.

Even when the primary color is magenta (M), yellow (Y) or black (K), the screen having the ruling of 166 lines and the angle of 66° is used, based on the first screen 321 of the screen information 300.

Next, examples of options of the screen (screen ruling, screen angle) corresponding to the secondary color are shown in FIG. 12.

The secondary color is a color that is obtained by mixing the primary color (first color component) and the second color component. Thus, as the screens corresponding to the secondary color, a specific screen that is selected from options described in an item of a screen 510 corresponding to the first color component and a specific screen that is selected from options described in an item of a screen 520 corresponding to the second color component are used, as shown in FIG. 12.

In this example, as shown in FIG. 12, for at least primary color, i.e., first color component and the second color component, screens having a predetermined screen angle or greater, for example 45° or greater are used. Thereby, generation of banding (horizontal stripe) is suppressed.

In addition, in this example, in the options of the screen corresponding to the first color component and the screen corresponding to the second color component, theses screens having a predetermined angle difference therebetween, for example 30° or greater, as shown in an item of an angle difference 530 of FIG. 12.

In other words, in FIG. 12, the screen angle difference between the specific screen of the options described in the item of the first screen 510 and the specific screen of the options described in the item of the second screen 520 is always 30° or greater, as shown in the angle differences described in the item of the angle difference 530. Thereby, the generation of screen interference moiré is suppressed.

Accordingly, as described above, the screen angles of the screens corresponding to the first and second color components are 45° or greater, and the difference in the screen angles between the two screens is 30° or greater. Thus, when the image formation is performed for an image of the secondary color, the generations of the banding (horizontal stripe) and the screen interference moiré are suppressed in the resultant image.

The first screen 321 and the second screen 322 of the screen information 300 are obtained by selecting a screen indicated with reference numeral 511 in FIG. 12 (which has the ruling of 166 lines and the angle of 56°) and a screen indicated with reference numeral 521 (which has the ruling of 146 lines and the angle of 104°). In this case, the angle difference between the two screens is 48°, which is indicated with reference numeral 531.

With regard to the secondary color, which is obtained by mixing cyan (C) and magenta (M), a result of the screen process is shown in FIG. 13C in which the screen 511, i.e., the screen (see FIG. 13A) having the ruling of 166 lines and the angle of 56° is used for cyan (C) that is the first color component, and the screen 521, i.e., the screen (refer to FIG. 13B) having the ruling of 146 lines and the angle of 104° is used for magenta (M) that is the second color component.

For the screen 521 (which has the ruling of 146 lines and the angle of 104°), a result (angle=θ) that is obtained by calculating a tan(b/a) is 76°, as shown in the screens of FIGS. 7C and 7D.

Next, examples of options of the screen (screen ruling, screen angle) corresponding to the tertiary color are shown in FIG. 14.

The tertiary color is a color that is obtained by mixing the primary color (first color component), the second color component and the third color component. Thus, as the screens corresponding to the tertiary color, a specific screen that is selected from options described in an item of a screen 610 corresponding to the first color component, a specific screen that is selected from options described in an item of a screen 620 corresponding to the second color component and a specific screen that is selected from options described in an item of a screen 630 corresponding to the third color component are used, as shown in FIG. 14.

In FIG. 14, an item of an 'angle difference 1' 640 shows angle differences between the options (screens corresponding to the first color component) described in the term of the screen 610 and the options (screens corresponding to the third color component) described in the item of the screen 630. Also, an item of an 'angle difference 2' 650 shows angle differences between the options (screens corresponding to the first color component) described in the term of the screen 610 and options (screens corresponding to the second color component) described in the item of the screen 620.

The options described in the item of the screen 610 and the options described in the item of the screen 620 corresponding to the second color component are the same as those described in the item of the screen 510 and those described in the item of the screen 520 corresponding to the second color component, which are shown in FIG. 12, respectively. The options described in the item of the screen 620 are those obtained in which a part of the options described in the item of the screen 520 is omitted. Also, the options described in the item of the screen 630 are partially shown.

Also, as can be clearly seen from FIG. 14, for at least primary color, i.e., first color component and the second color component, screens having a predetermined screen angle or greater, for example 45° or greater are used. For the color component other than the first and second color components, for example, for the third color component, a screen having an angle less than the predetermined screen angle (for example, less than 45°) is used. Also, a difference in screen angle between the screen corresponding to the first color component and the screen corresponding to the second color component is a predetermined angle or greater, for example 30° or greater.

The first screen 321, the second screen 322 and the third screen 323 of the screen information 300 are obtained by selecting a screen indicated with reference numeral 611 of FIG. 14 (which has the ruling of 166 lines and the angle of 56°), a screen indicated with reference numeral 621 (which has the ruling of 146 lines and the angle of 104°) and a screen indicated with reference numeral 631 (which has the ruling of 146 lines and the angle of 14°).

In this case, the angle difference between the screen 611 (screen corresponding to the first color component) and the screen 631 (screen corresponding to the third color component) is 42°, which is indicated with reference numeral 641. Also, the angle difference between the screen 611 (screen corresponding to the first color component) and the screen 621 (screen corresponding to the second color component) is 48°, which is indicated with reference numeral 651.

An example will be described in which a screen process is performed by applying a second color applying condition to three color components of the tertiary color (tertiary color of CMY) obtained by mixing cyan (C), magenta (M) and yellow (Y).

It can be said that the tertiary color is a tertiary color (tertiary color of CMY) that is obtained by mixing yellow (Y) with a secondary color (secondary color of CM) obtained by mixing cyan (C) and magenta (M).

Here, the second color applying condition is such that, for the tertiary color including yellow (Y), the third color component is yellow and the first color component and the second color component are colors except for yellow (Y). In this example, the first color component is cyan (C) or magenta (M) and the second color component is cyan (C) or magenta (M) that is not adopted as the first color component.

A result of the screen process in which the screen 611 (which has the ruling of 166 lines and the angle of 56°) is used for cyan (C) which is the first color component and the screen 621 (which has the ruling of 146 lines and the angle of 104°) is used for magenta (M) which is the second color component is shown in FIG. 15A.

A result of performing, for the result of the screen process of the secondary color (secondary color of CM), the screen process in which the screen 631 (which has the ruling of 146 lines and the angle of 14°) is used for yellow (Y) which is the third color component is shown in FIG. 15C.

For the screen 621 (which has the ruling of 146 lines and the angle of 104°), a result (angle=θ) that is obtained by calculating a tan(b/a) is 76°, as shown in the screens of FIGS. 7C and 7D.

Like the screen process of the tertiary color of CMY, for the tertiary color including yellow (Y), the halftone-dot generation section 160 sets yellow to correspond to the third component and uses for yellow a specific screen of the options described in the item of the screen 630 corresponding to the third color component, for example screen 631.

The reason is as follows. Since banding (horizontal stripe) is not noticeable in yellow, it doesn't matter that the screen angle of the screen corresponding to yellow is less than a predetermined screen angle, for example 45°.

Next, an example will be described in which the screen process is performed by applying a third color applying condition to three color components of the tertiary color including black (K).

The third color applying condition is such that, for the tertiary color including black (K), black (K) is set as a color component corresponding to a screen having a predetermined angle or greater, for example 45° or greater, from among the first color component, the second color component and the third color component.

This means that, for the tertiary color including black (K), a screen having a predetermined angle or greater, for example 45° or greater is applied as the screen corresponding to black (K) according to the third color applying condition.

For example, in the options of the screens corresponding to the tertiary color shown in FIG. 14, the option described in the item of the screen 610 corresponding to the first color component and the option described in the item of the screen 620 corresponding to the second color component are the screens having the screen angle of 45° or greater, respectively. Accordingly, the halftone-dot generation section 160 uses, as a screen corresponding to black (K), any of the screens corresponding to the first color component and second color component.

Figure 16A:
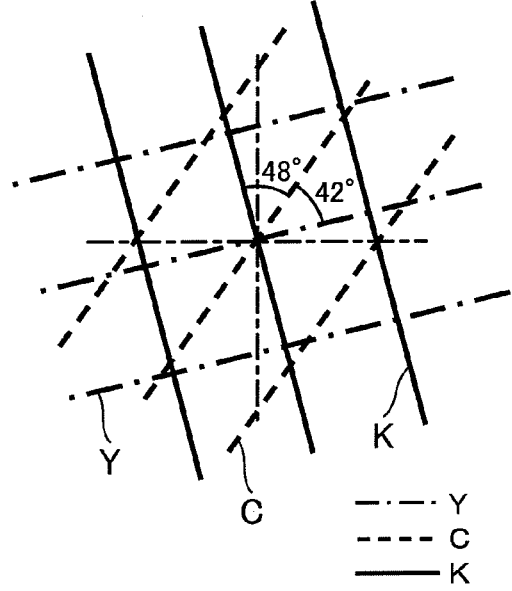
FIGS. 16A and 16B shows examples of screen process results in the case where three screens are used for tertiary colors (tertiary colors including black) according to the third example of the invention.
Figure 16B:
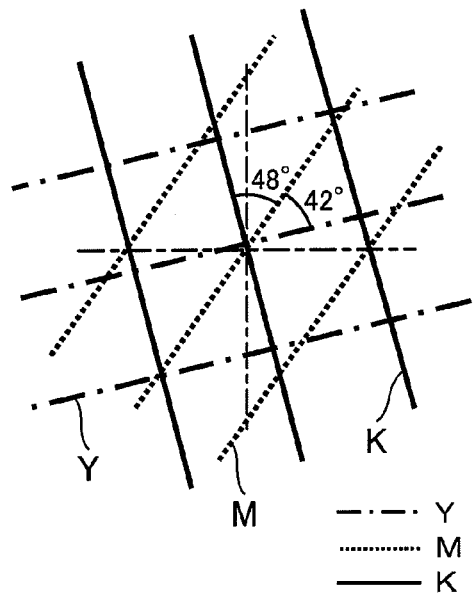

A result of the screen process which is performed by using the screens, to which the second color applying condition and the third color applying condition are applied, for the three color components of the tertiary color (tertiary color of KCY) of cyan (C), yellow (Y) and black (K) is shown in FIG. 16A. Also, a result of the screen process which is performed by using the screens, to which the second color applying condition and the third color applying condition are applied, for the three color components of the tertiary color (tertiary color of MYK) of magenta (M), yellow (Y) and black (K) is shown in FIG. 16B.

As described above, according to the third example, even when screens having low rulings (for example, rulings less than 200 lpi) are used as two screens corresponding to the secondary color and three screens corresponding to the tertiary color, the screen angles of the respective screens are 45° or greater and the screen angle difference between the screens are 30° or greater, for example, so that the screen interference moiré is reduced. Also, since there is no screen having a screen angle less than 45°, the banding (horizontal stripe) is reduced.

FOURTH EXAMPLE

In the fourth example, a screen process will be described in which screens corresponding to one or more color components of image data to be processed are used based on densities of the color components and a fourth color applying condition.

The fourth color applying condition is such that one or more color components of image data to be processed are set as the first color component, the second color component, the third color component and the fourth color component in order of color components having higher densities.

The halftone-dot generation section 160 determines one or more color components of the image data to be processed as the first color component, the second color component, the third color component and the fourth color component in order of color components having higher densities so as to comply with the fourth color applying condition, and uses screens corresponding to the determined color components.

In this case, the halftone-dot generation section 160 uses the first screen 321, the second screen 322, the third screen 323 and the fourth screen 324 of the screen information 300 shown in FIG. 2 for the determined first color component, second color component, third color component and fourth color component.

In the pulse-surface-area modulation using a screen (halftones), a density of a color component of image data is proportional to the number of halftone dots, i.e., data amount. For example, image data having a density of 80% has more halftones than image data having a density of 50%, so that the data amount of the former is also larger that that of the latter.

Next, selection of screens complying with the fourth color applying condition will be described with respect to image data having the primary, secondary, tertiary and quaternary colors.

It is assumed that the image data has one or more colors of the primary color of cyan (C) (primary color of C), the secondary color obtained by mixing cyan (C) and magenta (M) (secondary color of CM), the tertiary color obtained by mixing cyan (C), magenta (M) and yellow (Y) (tertiary color of CMY) and the quaternary color obtained by mixing cyan (C), magenta (M), yellow (Y) and black (K) (quaternary color of CMYK).

An example of image data (together with density (%)) is shown in FIG. 17.

It is assumed that image data 700 shown in FIG. 17 has data 1 to data 17. In FIG. 17, an item of 'C' 710 indicates densities (%) of cyan (C), an item of 'M' 720 indicates densities (%) of magenta (M), an item of 'Y' 730 indicates densities (%) of yellow (Y) and an item of 'K' 740 indicates densities (%) of black (K).

For example, for the data 10, '20(#3)' is indicated in the item of 'C' 710, '30(#2)' is indicated in the item of 'M' 720, '40(#1)' is indicated in the item of 'Y' 730 and '0' is indicated in the item of 'K' 740.

Here, '0' indicated in the item of 'K' 740 means that there is no color component of black.

In '40(#1)' indicated in the item of 'Y' 730, '40' indicates the density (%) of yellow (Y) and '#1' in the parenthesis indicates the first color component.

Also, in '30(#2)' indicated in the item of 'M' 720, '30' indicates the density (%) of magenta (M) and '#2' in the parenthesis indicates the second color component.

Also, in '20(#3)' indicated in the item of 'C' 710, '20' indicates the density (%) of cyan (C) and '#3' in the parenthesis indicates the third color component.

When this data 10 is data to be processed, the halftone-dot generation section 160 receives the Tag information (Tag=2) and the CMY data (raster data) as the tone-corrected data (pixel data) from the tone correction section 150.

Then, the halftone-dot generation section 160 determines screens from the screen information 300 shown in FIG. 2, based on (i) the data amounts of the respective colors of CMY of the data 10, i.e., the densities of the respective colors and (ii) the fourth color applying condition.

Specifically, since the data amounts of the respective colors of CMY of the data 10, i.e., the densities of the respective colors have a relation of 'yellow (Y)=40(%)>magenta (M)=30(%)>cyan (C)=20(%)', the halftone-dot generation section 160 determines yellow (Y) as the first color component, magenta (M) as the second color component and cyan (C) as the third color component.

Next, with regard to the screen information for tertiary color of the screen information 300 of FIG. 2 associated with the Tag information (Tag=2), the halftone-dot generation section 160 uses the first screen 321, which corresponds to the first color component, for yellow (Y), the second screen 322, which corresponds to the second color component, for magenta (M) and the third screen 323, which corresponds to the third color component, for cyan (C).

Also, for the data 1 to 9 and 11 to 17, the first color component (first to second color components, first to third color components, or first to fourth color components) are determined based on the density (densities) of data (data amount(s)), and of the screen information 300, a screen(s) of screen information associated with the Tag information are used for the determined first color component (first to second color components, first to third color components, or first to fourth color components), in a similar manner to the data 10.

As described above, in the fourth example, a color component(s) having relatively lower densities of the four color components, i.e., first to fourth color components (e.g., C, M, Y and K) are overlapped with a color component(s) having relatively higher densities. The image quality defect in the color component(s) having the relatively lower densities resulting from the image formation such as the moiré resulting from the screen interference and the banding (horizontal stripe) is reduced.

FIFTH EXAMPLE

In the fifth example, a screen process will be described in which screens corresponding to one or more color components of image data to be processed are used based on densities of the color components and a fifth color applying condition.

The fifth color applying condition is such that when one or more color components of image data to be processed includes the color component of yellow, the color component of yellow is regarded as a color component having the lowest density in the one or more color components of the first color component, the second color component, the third color component and the fourth color component.

The halftone-dot generation section 160 determines one or more color components of image data to be processed as the first color component, the second color component, the third color component and the fourth color component in order of color components having higher densities so as to comply with the fifth color applying condition, and uses screens corresponding to the determined color components.

In this case, similarly to the fourth example, the halftone-dot generation section 160 uses the first screen 321, the second screen 322, the third screen 323 and the fourth screen 324 of the screen information 300 shown in FIG. 2 for the determined first color component, second color component, third color component and fourth color component.

Next, selection of screens which meet the fifth color applying condition will be described with respect to the image data having the primary, secondary, tertiary and quaternary colors.

It is assumed, likewise the fourth example, that the image data includes one or more colors of the primary color of cyan (C) (primary color of C), the secondary color obtained by mixing cyan (C) and magenta (M) (secondary color of CM), the tertiary color obtained by mixing cyan (C), magenta (M) and yellow (Y) (tertiary color of CMY) and the quaternary color obtained by mixing cyan (C), magenta (M), yellow (Y) and black (K) (quaternary color of CMYK).

An example of the image data (density (%)) is shown in FIG. 18.

It is assumed that image data 800 shown in FIG. 18 has data 1 to data 17. In FIG. 18, an item of 'C' 810 indicates densities (%) of cyan (C), an item of 'M' 820 indicates densities (%) of magenta (M), an item of 'Y' 830 indicates densities (%) of yellow (Y) and an item of 'K' 840 indicates densities (%) of black (K). Also, '#1', '#2', '#3' and '#4' in parentheses corresponding to the densities indicate the first color component, the second color component, the third color component and the fourth color component, respectively.

The data 1 to 17 of the image data 800 have the same densities as those of the data 1 to 17 of the image data 700 shown in FIG. 17.

For example, when the data 10 is data to be processed, the halftone-dot generation section 160 receives the Tag information (Tag=2) and the CMY data (raster data) as the tone-corrected data (pixel data) from the tone correction section 150.

Then, the halftone-dot generation section 160 determines screens from the screen information 300 shown in FIG. 2, based on (i) the densities of the respective colors of CMY of the data 10, i.e., the densities of the respective colors and (ii) the fifth color applying condition.

Specifically, the data amounts of the respective colors of CMY of the data 10, i.e., the densities of the respective colors actually have a relation of 'yellow (Y)=40(%)>magenta (M)=30(%)>cyan (C)=20(%)'. However, according to the fifth color applying condition, yellow (Y)=40(%) is regarded as a color component having the lowest density. Accordingly, the halftone-dot generation section 160 determines that a relationship of 'magenta (M)=30(%)>cyan (C)=20(%)>yellow (Y)=40(%)' is established.

Accordingly, the halftone-dot generation section 160 determines magenta (M) as the first color component, cyan (C) as the second color component and yellow (Y) as the third color component.

Next, with regard to the screen information for tertiary color of the screen information 300 of FIG. 2 associated with the Tag information (Tag=2), the halftone-dot generation section 160 uses the first screen 321, which corresponds to the first color component, for magenta (M), the second screen 322, which corresponds to the second color component, for cyan (C) and the third screen 323, which corresponds to the third color component, for yellow (Y).

As described above, in the fifth example, since the banding (horizontal stripe) is not noticeable in the yellow screen, the screen having the screen angle less than 45°, i.e., the screen corresponding to the third or fourth color component is used for yellow regardless of the data amounts of yellow (density of yellow). Thereby, the banding (horizontal stripe) is reduced.

SIXTH EXAMPLE

In a sixth example, a screen process will be described in which screens corresponding to one or more color components of image data to be processed are used based on densities of the color components and a sixth color applying condition.

The sixth color applying condition is such that when one or more color components of image data includes the color component of black, the color component of black is regarded as a color component having the highest density in the one or more color components.

The halftone-dot generation section 160 determines one or more color components of image data to be processed as the first color component, the second color component, the third color component and the fourth color component in order of color components having higher densities so as to comply with the sixth color applying condition, and uses the screens corresponding to the determined color components.

In this case, likewise the fourth example, the halftone-dot generation section 160 uses the first screen 321, the second screen 322, the third screen 323 and the fourth screen 324 of the screen information 300 shown in FIG. 2 for the determined first color component, second color component, third color component and fourth color component.

Next, selection of screens complying with the sixth color applying condition and the fifth color applying condition of the fourth example will be described with respect to the image data having the primary, secondary, tertiary and quaternary colors.

It is assumed, likewise the fourth example, that the image data includes one or more colors of the primary color of cyan (C) (primary color of C), the secondary color obtained by mixing cyan (C) and magenta (M) (secondary color of CM), the tertiary color obtained by mixing cyan (C), magenta (M) and yellow (Y) (tertiary color of CMY) and the quaternary color obtained by mixing cyan (C), magenta (M), yellow (Y) and black (K) (quaternary color of CMYK).

An example of the image data (density (%)) is shown in FIG. 19.

It is assumed that image data 900 shown in FIG. 19 has data 1 to data 21. The data 1 to 21 is configured such data that data 18 to 21 are added to the data 1 to 17 of the image data 800.

In FIG. 19, an item of 'C' 910, an item of 'M' 920, an item of 'Y' 930 and an item of 'K' 940 have the same meanings as the item of 'C' 810, the item of 'M' 820, the item of 'Y' 830 and the item of 'K' 840. Also, '#1', '#2', '#3' and '#4' in parentheses corresponding to densities indicate the first color component, the second color component, the third color component and the fourth color component, respectively.

For example, when the data 20 is data to be processed, the halftone-dot generation section 160 receives the Tag information (Tag=3) and the CMYK data (raster data) as the tone-corrected data (pixel data) from the tone correction section 150.

Then, the halftone-dot generation section 160 determines screens from the screen information 300 shown in FIG. 2, based on (i) the data amounts of the respective colors of CMYK of the data 20, i.e., the densities of the respective colors, (ii) the fifth color applying condition and (iii) the sixth color applying condition.

Specifically, the data amounts of the respective colors of CMYK of the data 20, i.e., the densities of the respective colors actually have a relation of 'yellow (Y)=80(%)>magenta (M)=70(%)>cyan (C)=60(%)>black (K)=30(%)'. However, yellow (Y)=80(%) is regarded as a color component having the lowest density according to the fifth color applying condition, and black (K)=30(%) is regarded as a color component having the highest density according to the sixth color applying condition. Accordingly, the halftone-dot generation section 160 determines that a relationship of 'black (K)=30(%)>magenta (M)=70(%)>cyan (C)=60(%)>yellow (Y)=80(%)' is established.

Accordingly, the halftone-dot generation section 160 determines black (K) as the first color component, magenta (M) as the second color component, cyan (C) as the third color component and yellow (Y) as the fourth color component.

Next, with regard to the screen information for quaternary color of the screen information 300 of FIG. 2 associated with the Tag information (Tag=3), the halftone-dot generation section 160 uses the first screen 321, which corresponds to the first color component, for black (K), the second screen 322, which corresponds to the second color component, for magenta (M), the third screen 323, which corresponds to the third color component, for cyan (C) and the fourth screen 324, which corresponds to the fourth color component, for yellow (Y).

In the sixth example, the halftone-dot generation section 160 determines the screens from the screen information 300 shown in FIG. 2, based on the data amounts of the respective colors of CMYK of the data 20, i.e., the densities of the respective colors, the fifth color applying condition and the sixth color applying condition. However, the invention is not limited thereto. For example, the halftone-dot generation section 160 may determine the screens from the screen information 300 shown in FIG. 2, based on the data amounts of the respective colors of CMYK of the data 20, i.e., the densities of the respective colors and the sixth color applying condition.

In this case, the data amounts of the respective colors of CMYK of the data 20, i.e., the densities of the respective colors actually have a relation of 'yellow (Y)=80(%)>magenta (M)=70(%)>cyan (C)=60(%)>black (K)=30(%)'. However, black (K)=30(%) is regarded as a color component having the highest density according to the sixth color applying condition. Accordingly, the halftone-dot generation section 160 determines that a relationship of 'black (K)=30(%)>yellow (Y)=80(%)>magenta (M)=70(%)>cyan (C)=60(%)' is established.

As described above, in the sixth example, since the banding (horizontal stripe) is noticeable in the black screen, the screen having the screen angle of 45° or greater, i.e., the screen corresponding to the first color component is used for black regardless of the data amount of black (density of black). Thereby, the banding (horizontal stripe) is reduced.

SEVENTH EXAMPLE

In the first to sixth examples, it has been described that the screen process is performed for the primary color, the secondary color, the tertiary color and the quaternary color including one or more colors of cyan (C), magenta (M), yellow (Y) and black (K). However, in a seventh example, different screens are also used for one or more special colors such as gold, silver, orange and green.

In other words, in one example, the halftone-dot generation section 160 performs the screen process by using different screens for one or more color components of the primary color, the secondary color, the tertiary color and the quaternary color including the one or more special colors.

Also, in another example, the halftone-dot generation section 160 performs the screen process by using different screens for five or more color components of quinary or higher colors obtained by mixing the quaternary color including cyan (C), magenta (M), yellow (Y) and black (K) with the one or more special colors.

In the first to seventh examples, the image quality defect resulting from the image formation, i.e., defect (image quality defect) due to deviation of color registration (relative deviation of image positions when toner images of respective colors are overlapped on the intermediate transfer belt), for example color unevenness (in-plane color unevenness) is reduced.

Next, a hardware configuration of the image processing device 10 of the image forming apparatus 1 related to the above exemplary embodiments is described with reference to FIG. 20.

Figure 20:
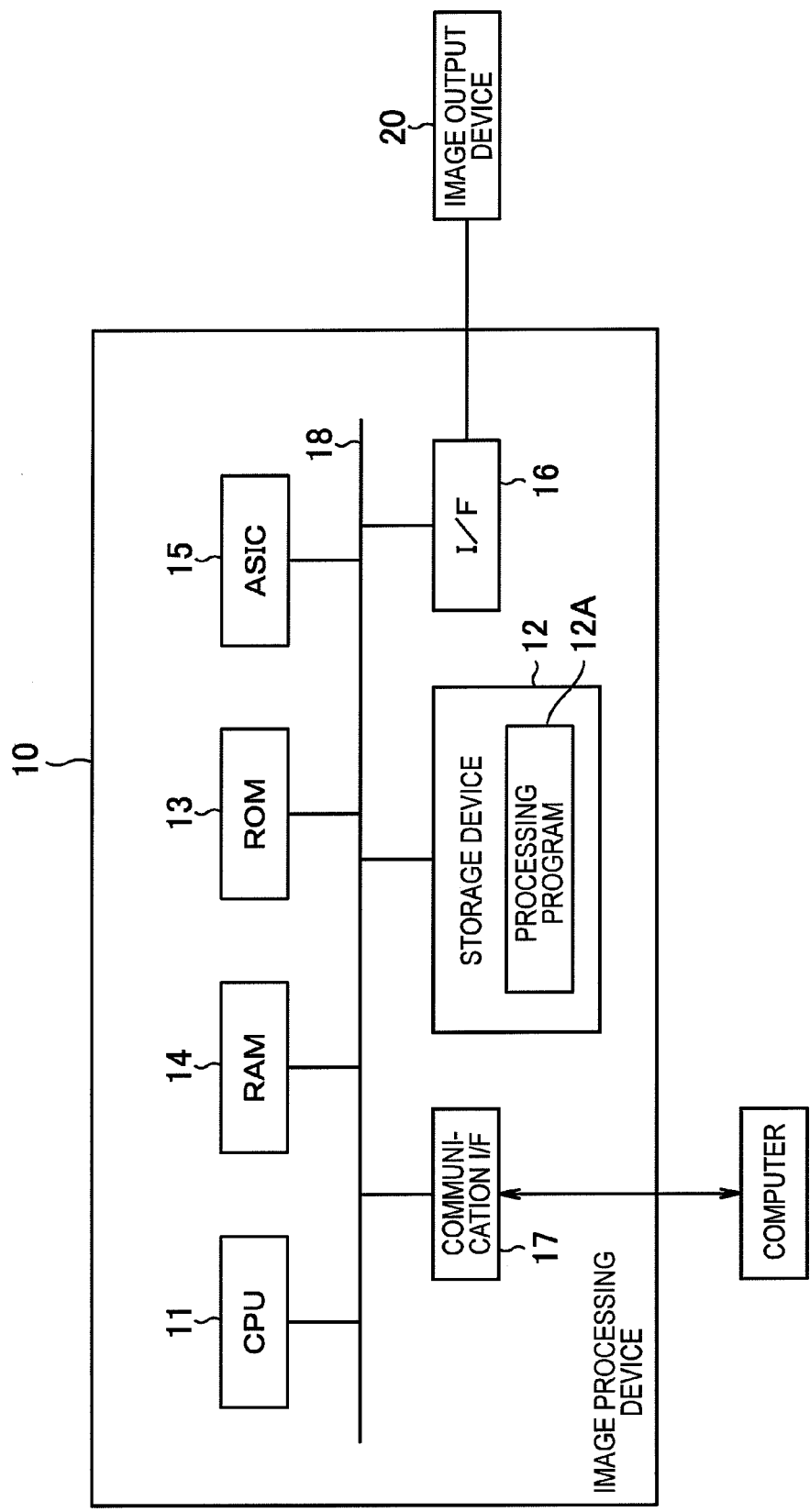
FIG. 20 is a block diagram showing the hardware configuration of an image processing device according to an exemplary embodiment of the invention.

As shown in FIG. 20, the image processing device 10 has a CPU 11, a storage device 12, a ROM 13, a RAM 14, an ASIC 15, an I/F 16 and a communication I/F 17. These constitutional elements are connected to a system bus 18.

The storage device 12 is a hard disk drive, for example and stores therein a variety of installed programs such as software (programs) for implementing the respective functions of the PLD interpretation section 110, the drawing section 120, the color conversion section 130, the color determination section 140, the tone correction section 150 and the halftone-dot generation section 160, which are shown in FIG. 1, a processing program 12A and the like.

The processing program 12A includes at least an execution processing procedure that executes the screen process by using the different screens for each of new color components, which are used in correspondence to N colors ranging from the primary color in the output color space to Nth colors (N is 2 or greater natural number) obtained by sequentially combining the primary color with the other primary colors. The execution processing procedure is executed by the halftone-dot generation section 160.

The ROM 13 is a read only memory and stores therein the information that is necessary for the color conversion section 130 to perform the color conversion, for example color conversion table (three dimensional lookup table), the information that is necessary for the tone correction section 150 to perform the tone correction, for example tone reproduction characteristic curve (TRC), the information that is necessary for the halftone-dot generation section 160 to perform the halftone-dot generation process (screen process), for example screen information, the communication protocol information for performing communication with an external apparatus such as computer, and the like.

In the meantime, the ROM 13 has the function of the screen information storage section 170 shown in FIG. 1.

The RAM 14 is a memory that is writable and readable frequently, and stores therein the program including the processing program 12A or data read out from the storage device 12, the information read out from the ROM 13, the result of the drawing process by the drawing process unit 120, the result of the color conversion processing by the color conversion section 130, the result of the color determination process by the color determination section 140, the result of the tone correction processing by the tone correction section 150, the result of the halftone-dot generation process (screen process) by the halftone-dot generation section 160, the data transmitted through the I/F 16, the data transmitted and received by the communication I/F 17, and the like.

The ASIC 15 is an application specification integrated circuit and has the function of the PWM process section 180 shown in FIG. 1.

The I/F 16 is an interface for performing communication with the image output device 20 and outputs the pulse signal (PWM signal) corresponding to the image data of the image formation target to the image output device 20.

The communication I/F 17 is to perform the communication with the external apparatus, for example computer through a communication line (network and the like) and receives the print data (PDL data) of the image formation target.

The CPU 11 is a central processing unit and reads and executes the program including the processing program 12A from the storage device 12 to the RAM 14, thereby implementing the respective functions of the PLD interpretation section 110, the drawing section 120, the color conversion section 130, the color determination section 140, the tone correction section 150 and the halftone-dot generation section 160 and the processing function corresponding to the processing program 12A. In addition, the CPU 11 controls the entire image processing device 10 (or image forming apparatus 1).

The invention has been specifically described with reference to the exemplary embodiments. However, the exemplary embodiments are just exemplary and should not be construed to limit the invention. In other words, the technical scope of the invention is not limited to the exemplary embodiments, should be construed within the definitions of the claims and includes all changes without departing from the defined technology of the claims, the equivalents thereof and the gist of the claims.

In addition, when using the program, the program may be provided through the network or storage medium such as CD-ROM in which the program is stored.

In other words, the invention is not limited to the case where the program including the processing program is recorded in the storage device such as hard disk drive and the program may be provided as follows.

For example, the program may be stored in the ROM, which is then loaded and executed into a main storage device from the ROM by the CPU.

In addition, the program may be stored in the computer-readable storage media such as DVD-ROM, CD-ROM, MO (optical magnetic disk), flexible disk and the like, which is then distributed.

In addition, the image processing device may be connected to a server apparatus or host computer via the communication line (for example, Internet), and the program may be downloaded from the server apparatus or host computer and then executed. In this case, a download destination of the program may be a memory such as RAM or a storage apparatus (storage medium) such as hard disk drive.

In the above descriptions, the image output device of the image forming apparatus is an image output device that forms an image by the electrophotography method. However, the invention may be applied to an image output device of an inkjet type that performs the recordation by discharged ink.

The foregoing description of the exemplary embodiments of the invention has been provided for the purposes of illustration and description. It is not intended to be exhaustive or to limit the invention to the precise forms disclosed. Obviously, many modifications and variations will be apparent to practitioners skilled in the art. The exemplary embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image processing device comprising:
a processor that executes a screen process by using screen information for a plurality of colors in an output color space including a primary color and a secondary color, wherein
the primary color is a first color component,
the secondary color is obtained by mixing the first color component with a second color component,
the screen information of the primary color includes a first screen for the first color component, and
the screen information of the secondary color includes the first screen for the first color component and a second screen for the second color component.

2. An image forming apparatus comprising:
the image processing device according to claim 1, and
an image forming unit that forms an image based on a result of the screen process by the image processing device.

3. The image forming device according to claim 1, wherein the plurality of colors further includes a tertiary color,
the tertiary color is obtained by mixing a third color component with the first color component and the second color component, and
the screen information of the tertiary color includes the first screen for the first color component, the second screen for the second color component, and a third screen for the third color component.

4. The image forming device according to claim 3, wherein the plurality of colors further includes a quaternary color,
the quaternary color is obtained by mixing a fourth color component with the first color component, the second color component, and the third color component, and
the screen information of the quaternary color includes the first screen for the first color component, the second screen for the second color component, the third screen for the third color component, and a fourth screen for the fourth color component.

5. An image processing device comprising:
a processor that executes a screen process for image data by using different screens for first to Nth color components, where N denotes natural number equal to or larger than 2, wherein
a primary color is the first color component,
an i-th color is obtained by mixing i-th color component with (i−1)th color, where i denotes natural number and 2≤i≤N, and
the image data includes at least one of the primary color to the N-th color.

6. An image forming apparatus comprising:
the image processing device according to claim 5, and
an image forming unit that forms an image based on a result of the screen process by the image processing device.

7. An image processing device comprising:
a processor that performs a screen process for image data by using screens which are different for first to fourth color components, wherein
a primary color is the first color component,
a secondary color is obtained by mixing the second color component with the primary color,
a tertiary color is obtained by mixing the third color component with the secondary color,
a quaternary color is obtained by mixing the fourth color component with the tertiary color, and
the image data includes at least one of the primary color, the secondary color, the tertiary color and the quaternary color.

8. The image processing device according to claim 7, wherein
the processor uses screens having a predetermined screen angle or greater, for at least the first color component and the second color component, and
the processor uses screens having a screen angle less than the predetermined angle, for the color components other than the color components for which the screens having the predetermined screen angle or greater are used.

9. The image processing device according to claim 8, wherein
the processor determines, as the first color component, the second color component, the third color component and the fourth color component, one or more color components of the image data in order of color components having higher densities, and
the processor uses screens corresponding to the determined color components.

10. The image processing device according to claim 9, wherein
if the one or more color components of the image data include a color component of yellow, the processor uses, for the color component of yellow, a screen corresponding to the color component having the lowest density.

11. The image processing device according to claim 9, wherein if the one or more color components of the image data include a color component of black, the processor uses, for the color component of black, a screen corresponding to the first color component having the highest density in the one or more color components.

12. The image processing device according to claim 7, wherein
if the primary color is a color component of black, the processor uses a screen having a low ruling for the color component of black,
if the color component of black is included in any one of the secondary color, the tertiary color and the quaternary color, the processor uses a screen having a high ruling for the color component of black, and
the high ruling is higher in ruling than the low ruling.

13. The image processing device according to claim 12, wherein
the low ruling is less than 200 lines per inch (lpi), and
the high ruling is equal to or larger than 200 lpi.

14. An image forming apparatus comprising:
the image processing device according to claim 7, and
an image forming unit that forms an image based on a result of the screen process by the image processing device.

15. The image processing device according to claim 7, wherein the processor performs the screen process for the image data by another different screen for a fifth color component, wherein a fifth color is obtained by mixing the fifth color component with the quaternary color, and the image data further includes the fifth color.

16. The image processing device according to claim 15, wherein the processor performs the screen process for the image data by another different screen for a sixth color component, wherein a sixth color is obtained by mixing the sixth color component with the fifth color, and the image data further includes the sixth color.

17. A non-transitory computer readable recording medium storing a program that causes a computer to execute image processing, the image processing comprising:

executing a screen process by using screen information for a plurality of colors in an output color space including a primary color and a secondary color, wherein the primary color is a first color component, the secondary color is obtained by mixing the first color component with a second color component, the screen information of the primary color includes a first screen for the first color component, and the screen information of the secondary color includes the first screen for the first color component and a second screen for the second color component.

* * * * *